(12) United States Patent
Shimizu

(10) Patent No.: US 12,332,842 B2
(45) Date of Patent: Jun. 17, 2025

(54) FILE TRANSFER SYSTEM, FILE TRANSFER METHOD, AND FILE TRANSFER PROGRAM

(71) Applicant: Hitachi, Ltd., Tokyo (JP)

(72) Inventor: Tomoki Shimizu, Tokyo (JP)

(73) Assignee: HITACHI VANTARA, LTD., Yokohama (JP)

( * ) Notice: Subject to any disclaimer, the term of this patent is extended or adjusted under 35 U.S.C. 154(b) by 0 days.

(21) Appl. No.: 18/603,307

(22) Filed: Mar. 13, 2024

(65) Prior Publication Data

US 2024/0411723 A1 Dec. 12, 2024

(30) Foreign Application Priority Data

Jun. 7, 2023 (JP) ................................ 2023-093677

(51) Int. Cl.
*G06F 16/16* (2019.01)
*G06F 16/182* (2019.01)

(52) U.S. Cl.
CPC ............ *G06F 16/16* (2019.01); *G06F 16/182* (2019.01)

(58) Field of Classification Search
CPC ................................ G06F 16/16; G06F 16/182
USPC ........................................................ 707/821
See application file for complete search history.

(56) References Cited

U.S. PATENT DOCUMENTS

| | | | | |
|---|---|---|---|---|
| 9,503,542 B1* | 11/2016 | Wang | ...................... | H04L 67/06 |
| 9,563,361 B1* | 2/2017 | Aslot | ..................... | G06F 3/0613 |
| 10,162,828 B2* | 12/2018 | Foster | ..................... | G06F 16/13 |
| 11,455,290 B1* | 9/2022 | Brahmadesam | ...... | G06F 16/162 |
| 2015/0089028 A1* | 3/2015 | Zheng | ..................... | H04L 67/55 |
| | | | | 709/219 |
| 2021/0303158 A1 | 9/2021 | Nomura et al. | | |
| 2024/0086195 A1* | 3/2024 | Horsnell | ............... | G06F 9/3004 |
| 2024/0323127 A1* | 9/2024 | Chen | ................. | H04W 28/0289 |

FOREIGN PATENT DOCUMENTS

JP 2021-157381 A 10/2021

* cited by examiner

*Primary Examiner* — Hicham Skhoun
(74) *Attorney, Agent, or Firm* — MATTINGLY & MALUR, PC

(57) ABSTRACT

A file transfer system transfers a target file updated in a first computer to a second computer for each part obtained by dividing the target file and includes: an update recording unit that records an update position of the target file in the first computer as an offset flag; an update determination unit that refers to the offset flag and determines presence or absence of update for each part of the target file; and a transfer unit that transfers the part determined to have update by the update determination unit to the second computer, in which when re-update in which the target file is updated after the transfer unit starts transferring any part included in the target file occurs, the transfer unit transfers, to the second computer, a re-update part that is the part updated by the re-update, regardless of whether or not the re-update part has already been transferred.

9 Claims, 27 Drawing Sheets

| PRIORITY ORDER | STATE |
|---|---|
| 1 | More Dirty |
| 2 | Dirty |
| 3 | Clean Transferred Copied |

| FILE FLAG ||
|---|---|
| FILE IDENTIFIER | UPDATE STATE |
| File001 | Dirty |
| File002 | Clean |
| .. | .. |

224

| FILE IDENTIFIER: File001 |||
|---|---|---|
| START OFFSET | SIZE | UPDATE STATE |
| 0 MB | 5 MB | Dirty |
| 5 MB | 5 MB | Clean |
| 10 MB | 5 MB | Dirty |
| .. | .. | .. |

| FILE IDENTIFIER: File002 |||
|---|---|---|
| START OFFSET | SIZE | UPDATE STATE |
| 0 MB | 5 MB | Clean |
| 5 MB | 3 MB | Clean |
| .. | .. | .. |

225

| FILE IDENTIFIER: File001 |||
|---|---|---|
| START OFFSET | END OFFSET | UPDATE STATE |
| 0x0000 | 0x0010 | Clean |
| 0x0011 | 0x0013 | Dirty |
| 0x0014 | 0x0fff | Clean |
| .. | .. | .. |

| FILE IDENTIFIER: File002 |||
|---|---|---|
| START OFFSET | END OFFSET | UPDATE STATE |
| 0x0000 | 0xc3500 | Clean |

FIG. 6

| EVENT / STATE BEFORE TRANSITION | | E1 UPDATED OTHER THAN DURING TRANSFER PROCESSING | E2 UPDATED DURING TRANSFER PROCESSING | E3 COMPLETE DUPLICATION/ TRANSFER DURING TRANSFER PROCESSING | E4 RECOGNIZE AS ADDITIONAL TRANSFER TARGET | E5 DETERMINE TRANSFER PROCESSING | E6 CANCEL TRANSFER PROCESSING |
|---|---|---|---|---|---|---|---|
| S1 | Clean | Dirty | More Dirty | Copied | × | × | × |
| S2 | Dirty | Dirty | More Dirty | Transferred | × | × | × |
| S3 | More Dirty | × | More Dirty | × | Dirty | × | × |
| S4 | Copied | Dirty | More Dirty | × | × | Clean | Clean |
| S5 | Transferred | Dirty | More Dirty | × | × | Clean | Dirty |

FILE TRANSFER SYSTEM, FILE TRANSFER METHOD, AND FILE TRANSFER PROGRAM

CROSS-REFERENCE TO RELATED APPLICATION

This application is based upon and claims the benefit of priority of the prior Japanese Patent Application No. 2023-093677, filed on Jun. 7, 2023, the entire contents of which are incorporated herein by reference.

BACKGROUND OF THE INVENTION

1. Field of the Invention

The present invention relates to a file transfer system, a file transfer method, and a file transfer program.

2. Description of the Related Art

A file to be transferred may be updated during transfer of the file. JP 2021-157381 A discloses a file storage system that includes a first file system provided to an application, a first storage system in which a file is stored by the first file system, and a processor, and can use a second storage system, the file storage system including state management information in which a state of the file is stored, a state information management unit that manages the state management information, and a file virtualization unit that manages files stored in the first storage system and the second storage system, in which the processor performs calling processing of the first file system on the basis of an operation request of the file from the application, the first file system processes the operation request of the file, the state information management unit performs update processing of the state management information of the file on the basis of input information or operation content to the first file system regarding the operation request, and the file virtualization unit performs management processing of the file between the first storage system and the second storage system on the basis of the state management information.

SUMMARY OF THE INVENTION

In the invention described in JP 2021-157381 A, there is room for improvement in a file transfer method.

A file transfer system according to a first aspect of the present invention is a file transfer system that transfers a target file updated in a first computer to a second computer for each part obtained by dividing the target file, the file transfer system including: an update recording unit that records an update position of the target file in the first computer as an offset flag; an update determination unit that refers to the offset flag and determines presence or absence of update for each part of the target file; and a transfer unit that transfers the part determined to have update by the update determination unit to the second computer, in which when re-update in which the target file is updated after the transfer unit starts transferring any part included in the target file occurs, the transfer unit transfers, to the second computer, a re-update part that is the part updated by the re-update, regardless of whether or not the re-update part has already been transferred.

A file transfer method according to a second aspect of the present invention is a file transfer method for transferring a target file updated in a first computer to a second computer for each part obtained by dividing the target file by the first computer, the file transfer method including: update recording processing of recording an update position of the target file in the first computer as an offset flag; update determination processing of determining presence or absence of update for each part in the target file with reference to the offset flag; and transfer processing of transferring the part determined to have update by the update determination processing to the second computer, in which when re-update in which the target file is updated after transfer of any part included in the target file is started by the transfer processing occurs, the transfer processing transfers, to the second computer, a re-update part that is the part updated by the re-update, regardless of whether or not the re-update part has already been transferred.

A file transfer program according to a third aspect of the present invention is a file transfer program executed in a first computer for transferring a target file updated in the first computer to a second computer for each part obtained by dividing the target file, the file transfer program including: an update recording unit that records an update position of the target file in the first computer as an offset flag; an update determination unit that refers to the offset flag and determines presence or absence of update for each part of the target file; and a transfer unit that transfers the part determined to have update by the update determination unit to the second computer, in which when re-update in which the target file is updated after the transfer unit starts transferring any part included in the target file occurs, the transfer unit transfers, to the second computer, a re-update part that is the part updated by the re-update, regardless of whether or not the re-update part has already been transferred.

According to the present invention, a file can be efficiently transferred.

BRIEF DESCRIPTION OF THE DRAWINGS

FIG. 5 is a diagram for explaining flag data;
FIG. 6 is a transition diagram of an event and a state flag in a part and an offset.

DESCRIPTION OF THE PREFERRED EMBODIMENTS

First Embodiment

Hereinafter, a first embodiment of a file transfer system will be described with reference to FIGS. 1 to 27.

Figure 1:
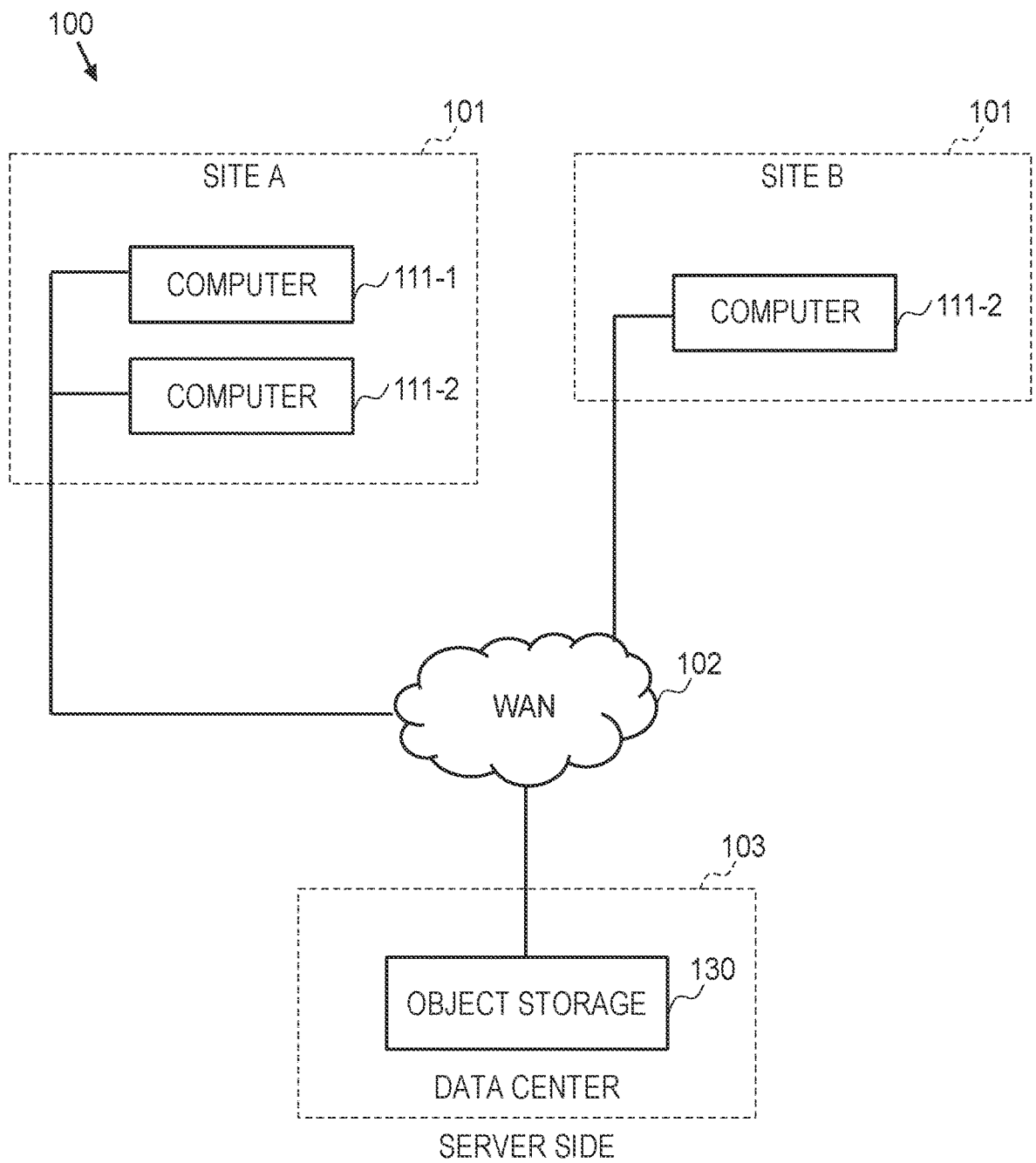
FIG. 1 is a configuration diagram of a file transfer system.

FIG. 1 is a configuration diagram of a file transfer system 100. The file transfer system includes one data center 103 and a plurality of sites 101. The data center 103 and the sites 101 are connected by a wide area network 102. Each site 101 includes one or more computers 111. The data center 103 includes an object storage 130. In FIG. 1, the computers 111 are distinguished from each other by attaching branch numbers, but since the computers 111 have a common functional configuration, the configuration and operation of one computer 111 will be described below. In the present embodiment, transfer of a file from the computer 111 to the object storage 130 will be described.

However, each of the computers 111 may additionally have configurations and functions other than those described below, or the configurations and functions additionally provided to each of the computers 111 may be different from each other. In addition, a plurality of computers 111 may not be included in the file transfer system, or the computer 111 and the object storage 130 may be locally connected.

Figure 2:
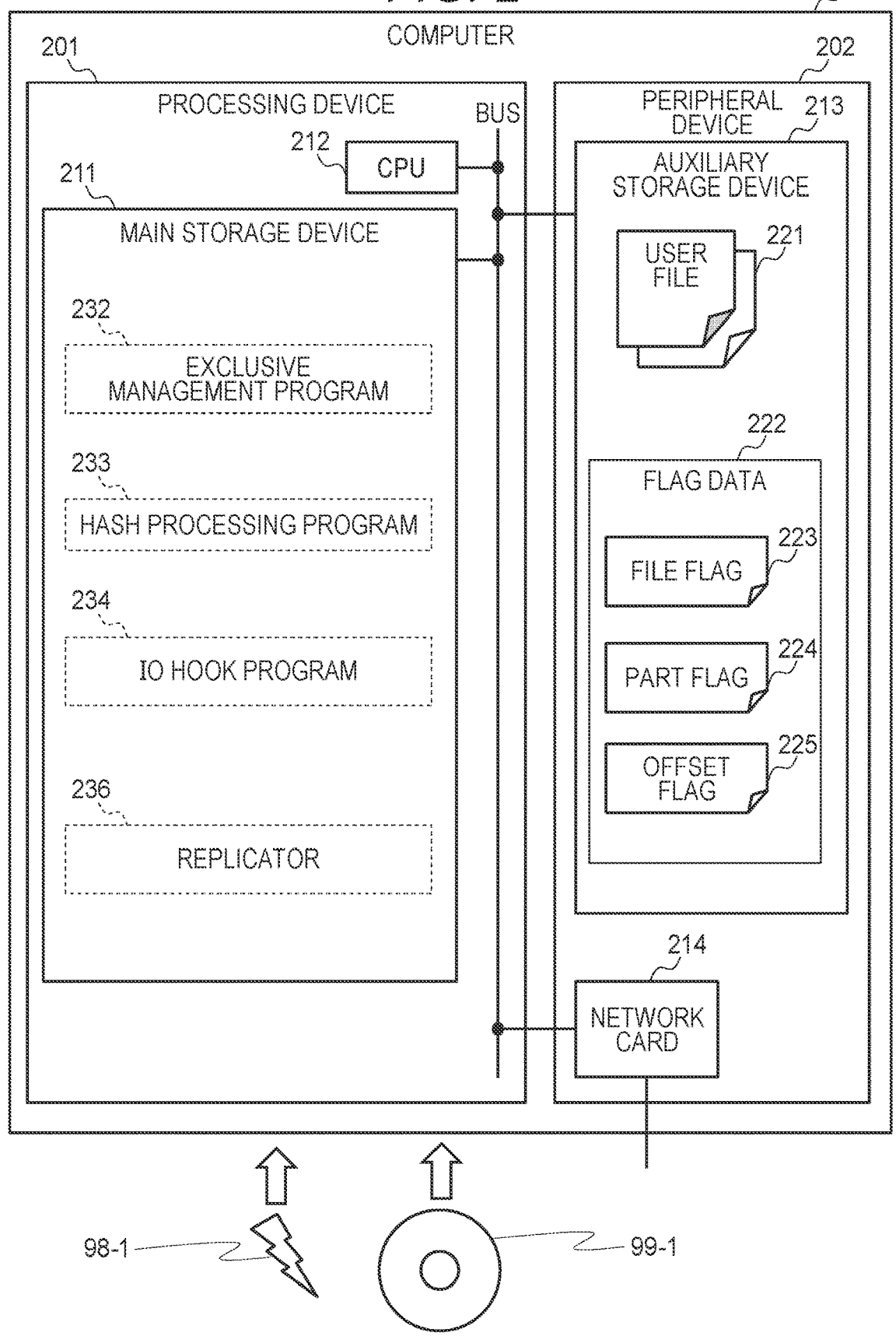
FIG. 2 is a configuration diagram of a computer.

FIG. 2 is a configuration diagram of a computer 111. The computer 111 includes a processing device 201 and a peripheral device 202. The processing device 201 includes a main storage device 211 and a CPU 212. The peripheral device 202 includes an auxiliary storage device 220 and a network card (network interface card) 214. The main storage device 211, the CPU 212, the auxiliary storage device 213, and the network card 214 are connected by a bus.

The main storage device 211 stores an exclusive management program 232, a hash processing program 233, an IO hook program 234, and a replicator 236. The exclusive management program 232 restricts writing to a user file 221 on the basis of the operation instruction received from the replicator 236. The hash processing program 233 calculates a hash value for the entire user file 221 or a part of the user file 221. As a method of calculating the hash value, various known methods can be used, and for example, SHA-256 or MD5 can be used.

The IO hook program 234 detects write processing to the user file 221, and writes a file flag 223 and an offset flag 225 of flag data 222. However, the content written in the offset flag 225 by the IO hook program 234 changes according to an instruction from the replicator 236. Hereinafter, the IO hook program 234 is also referred to as an "update recording unit".

The replicator 236 transmits the user file 221 stored in the computer 111 to the object storage 130. In the present embodiment, "transmission" and "transfer" are used in the same meaning. However, the replicator 236 does not necessarily transmit the entire user file 221, but divides the user file 221 and transmits only a necessary part. Hereinafter, the transfer of the user file 221 by the replicator 236 is also referred to as MPU (Multi Part Upload). There are a plurality of transfer modes in the MPU, and which transfer mode to use is set in advance. The replicator 236 uses the exclusive management program 232, the hash processing program 233, and the IO hook program 234 as necessary. Further, the replicator 236 writes and reads the flag data 222. A detailed operation of the replicator 236 will be described later.

The auxiliary storage device 213 stores a user file 221 and flag data 222. The user file 221 is a file to be transferred to the object storage 130. Although there may be a plurality of user files 221, a case where one user file 221 is set as a transfer target will be mainly described below. The flag data 222 includes a file flag 223, a part flag 224, and an offset flag 225. The flag data 222 is written from the IO hook program 234 and the replicator 236. The flag data 222 will be described in detail later.

Note that the computer 111 may further include a storage medium interface (not illustrated), and may read a program from a storage medium 99-1 and store the program in the ROM and the main storage device 211 (not illustrated). Further, the computer 111 may receive the program as a data signal from the outside via a carrier wave 98-1 and store the received program in the ROM and the main storage device 211 (not illustrated).

Figure 3:
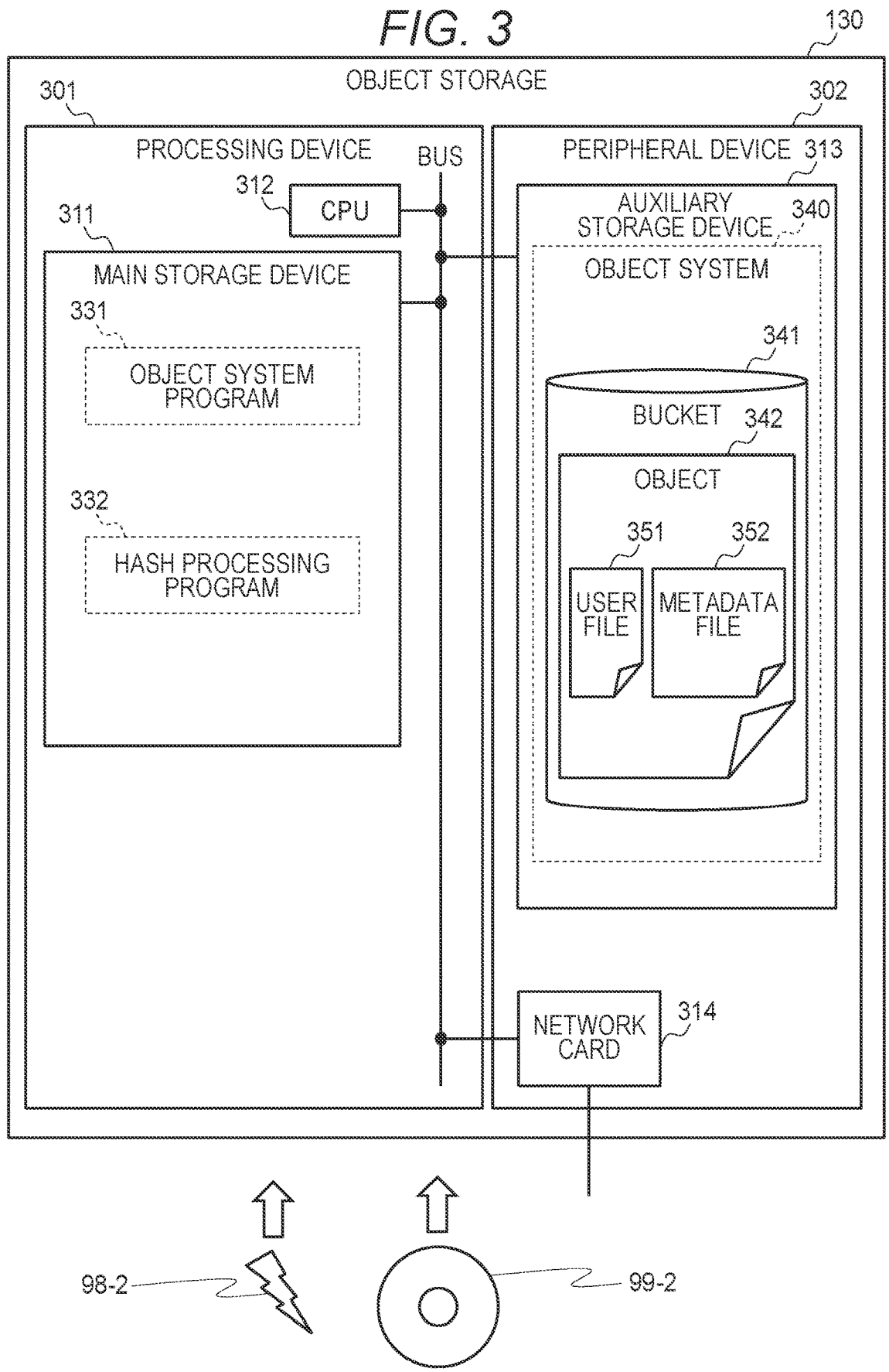
FIG. 3 is a configuration diagram of an object storage.

FIG. 3 is a configuration diagram of the object storage 130. The object storage 130 includes a processing device 301 and a peripheral device 302. The processing device 301 includes a main storage device 311 and a CPU 312. The main storage device 311 stores an object system program 331 and a hash processing program 332. The peripheral device 302 includes an auxiliary storage device 313 and a network card 314. The auxiliary storage device 313 includes an object system 340. The object system 340 includes a bucket 341. An object 342 is stored in the bucket 341. The object 342 includes a user file 351 and a metadata file 352. The main storage device 311, the CPU 312, the auxiliary storage device 313, and the network card 314 are connected by a bus.

The user file 351 in FIG. 3 corresponds to the user file 221 in FIG. 2. The object system program 331 operates in cooperation with the replicator 236 of the computer 111 and updates the user file 351. Immediately after the processing by the replicator 236 is normally completed, the user file 351 in FIG. 3 is the same as the user file 221 in FIG. 2. The metadata file 352 includes data attached by the object system program 331 to manage the user file 221 as an object 342.

Specifically, the object system program 331 duplicates a part instructed to receive a duplication instruction of the part from the replicator 236, further calculates a hash value of the duplicated part using the hash processing program 332, and transmits the calculated hash value to the computer 111. When the part is transmitted from the replicator 236, the object system program 331 calculates a hash value of the received part using the hash processing program 332 and transmits the calculated hash value to the computer 111. Hereinafter, the object storage 130 is also referred to as a "second computer".

Note that the object storage 130 may further include a storage medium interface (not illustrated), and may read a program from a storage medium 99-2 and store the program in the ROM and the main storage device 311 (not illustrated). Furthermore, the object storage 130 may receive a program as a data signal from the outside via a carrier wave 98-2 and store the received program in the ROM and the main storage device 311 (not illustrated).

Figure 4:
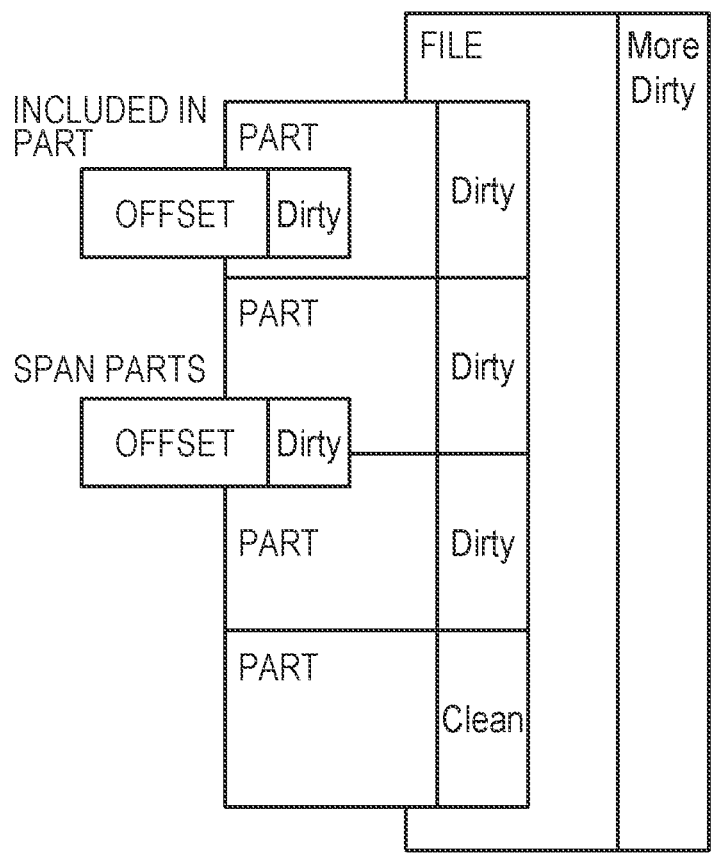
FIG. 4 is a conceptual diagram illustrating a state flag.

FIG. 4 is a conceptual diagram illustrating a state flag. The user file 221 is divided into a plurality of parts. A part is a unit of data transfer. However, the unit of data transfer mentioned here is not limited to the maximum data size in one communication, for example, the maximum size of an IP packet, and any size may be set for convenience of management or the like. In addition, in the present embodiment, writing to a file is recorded in byte units, and this is referred to as "offset" for convenience. Since the offset corresponds to a write area, it may be one byte or two or more bytes. In other words, the offset may be included in one part or may span multiple parts.

As illustrated in FIG. 4, in the present embodiment, in order to determine whether or not the transfer is necessary, the file, the part, and the offset are managed with a state flag. In the present embodiment, the state flags of the file, the part, and the offset are managed as a file flag 223, a part flag 224, and an offset flag 225. However, the three types of flags may be collectively managed at one place. That is, although FIG. 4 illustrates that the state flag is attached to the file, the file and the state flag are not integrated in practice. The relationship between the part and the state flag is the same, and the relationship between the offset and the state flag is the same.

When writing is performed on a certain area of the user file 221, the written area is recorded as an offset, and the state flag of the offset is set to "Dirty". In addition, a part including an offset whose state flag is "Dirty" and a file to which writing has been performed have the state flag set to "Dirty". A detailed transition of the state flag will be described later.

The state flag includes three main states and two temporary states, and there are five states in total. The main three states are "Clean", "Dirty", and "More Dirty". The two temporary states are "Copied" and "Transferred". A file takes one of three main states, and a part and an offset take one of five states.

The lower part of FIG. 4 is a diagram illustrating the priority order of the state flag. "More Dirty" has the highest priority, "Dirty" has the second highest priority, and "Clean", "Transferred", and "Copied" have the lowest priority. This priority is taken into account in determining the state flags of the parts and files and is set to the value of the highest priority within the range. That is, when there are a plurality of offsets included in a part, the state flag of the part is set to the state flag having the highest priority among the plurality of state flags. Further, when there are a plurality of parts included in a certain file, the state flag of the file is set to the state flag having the highest priority among the plurality of state flags.

FIG. 5 is a diagram for explaining the flag data 222. As described above, the flag data 222 includes the file flag 223, the part flag 224, and the offset flag 225. A file flag 223 illustrated in the upper part of FIG. 5 is a set of state flags for each user file 221. In the example illustrated in FIG. 5, the state flag of "File001" is set to "Dirty", and the state flag of "File002" is set to "Clean".

A part flag 224 illustrated in the middle part of FIG. 5 is a set of state flags for each file and each part. The size of the part may be common to all files or may be different for each file. The size of the part is set in advance, for example. In the example illustrated in FIG. 5, the parts are uniformly 5 MB, the first part of "File001" is "Dirty", and the second part is "Clean". Both parts of "File002" are "Clean". That is, since at least one part of "File001" is "Dirty", "File001" is "Dirty" in a file unit, and since all parts of "File002" are "Clean", "File002" is "Clean" in a file unit.

The offset flag 225 illustrated in the lower part of FIG. 5 is a set of state flags for each file and each offset. For convenience of drawing, only the offset included in the range of 0 to 5 MB which is the first part is described in "File001". Here, it is illustrated that writing to "0x0011 to 0x0013" has been performed and "Dirty" has been set. The offset can be recorded in the offset flag 225 at an arbitrary granularity. For example, since the entire area of "File002" is "Clean", "File002" can be described in one record.

FIG. 6 is a transition diagram of an event and a state flag in a part and an offset. "Update" in the table means that writing is performed by the computer 111. "During transfer processing" means during MPU. "X" in the table means that the corresponding transition is not assumed.

When an update is performed other than during the transfer processing in the "Clean" state, the state transitions to "Dirty". When an update is performed during the transfer processing in the "Clean" state, the state transitions to "More Dirty". When the duplication during the transfer processing is completed in the "Clean" state, the state transitions to "Copied". When an update is performed other than during the transfer processing in the "Dirty" state, the state remains in "Dirty". When an update is performed during the transfer processing in the "Dirty" state, the state transitions to "More Dirty". When the duplication during the transfer processing is completed in the "Dirty" state, the state transitions to "Transferred". When an update is performed during the transfer processing in the "More Dirty" state, the state remains in "More Dirty". When it is recognized as an additional transfer target during the transfer processing in the state of "More Dirty", the state transitions to "Dirty".

When an update is performed other than during the transfer processing in the "Copied" state, the state transitions to "Dirty". When an update is performed during the transfer processing in the "Copied" state, the state transitions to "More Dirty". When the transfer processing is determined in the "Copied" state, the state transitions to "Clean". When the transfer processing is canceled in the "Copied" state, the state transitions to "Clean". When an update is performed other than during the transfer processing in the "Transferred" state, the state transitions to "Dirty". When an update is performed during the transfer processing in the "Transferred" state, the state transitions to "More Dirty". When the transfer processing is determined in the "Transferred" state, the state transitions to "Clean". When the transfer processing is canceled in the "Transferred" state, the state transitions to "Dirty".

Figure 7:
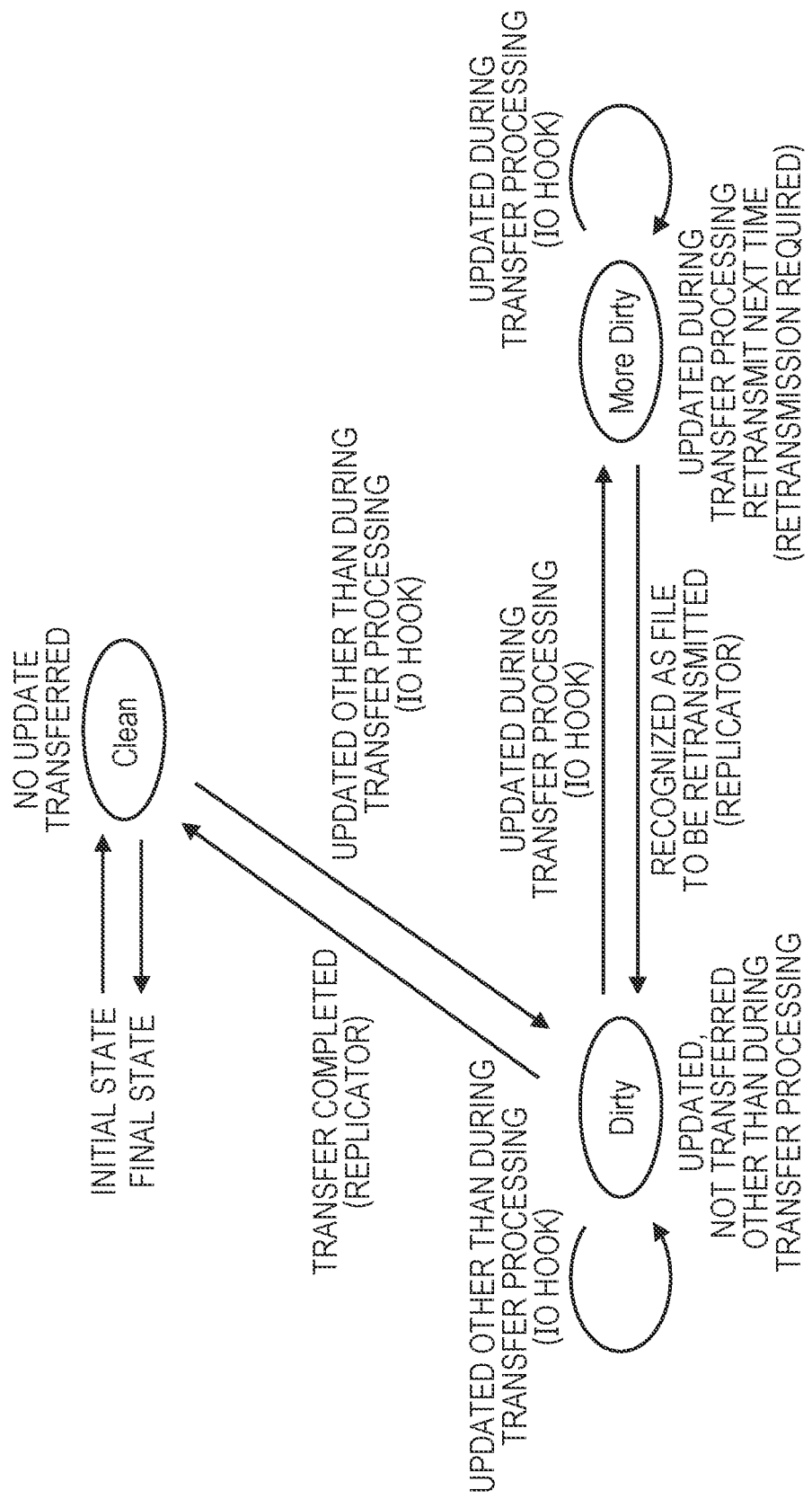
FIG. 7 is a transition diagram of a state flag in a file.

FIG. 7 is a transition diagram of a state flag in a file. As described above, the state flag of the file takes three states of "Clean", "Dirty", and "More Dirty". The initial state and the final state are "Clean". "Clean" means no transfer or transferred. "Dirty" means that there is an update other than during the transfer processing and the data has not been transferred. "More Dirty" means that there is an update during the transfer processing and retransmission is necessary next time.

When the state flag is "Clean" and there is an update to the file other than during the transfer processing, the IO hook program 234 causes the state flag of the file to transition to "Dirty". When the transfer of the file is completed in a state where the state flag is "Dirty", the replicator 236 sets the state flag of the file to "Clean". When the state flag is "Dirty"

and the file is updated other than during the transfer processing, the IO hook program 234 maintains the state flag of the file at "Dirty".

When the file is updated during the transfer processing in a state where the state flag is "Dirty", the IO hook program 234 causes the state flag of the file to transition to "More Dirty". When the file is recognized as a file that needs to be retransmitted in a state where the state flag is "More Dirty", the replicator 236 causes the state flag of the file to transition to "Dirty". When the file is updated during the transfer processing in a state where the state flag is "More Dirty", the IO hook program 234 maintains the state flag of the file at "More Dirty".

Figure 8:
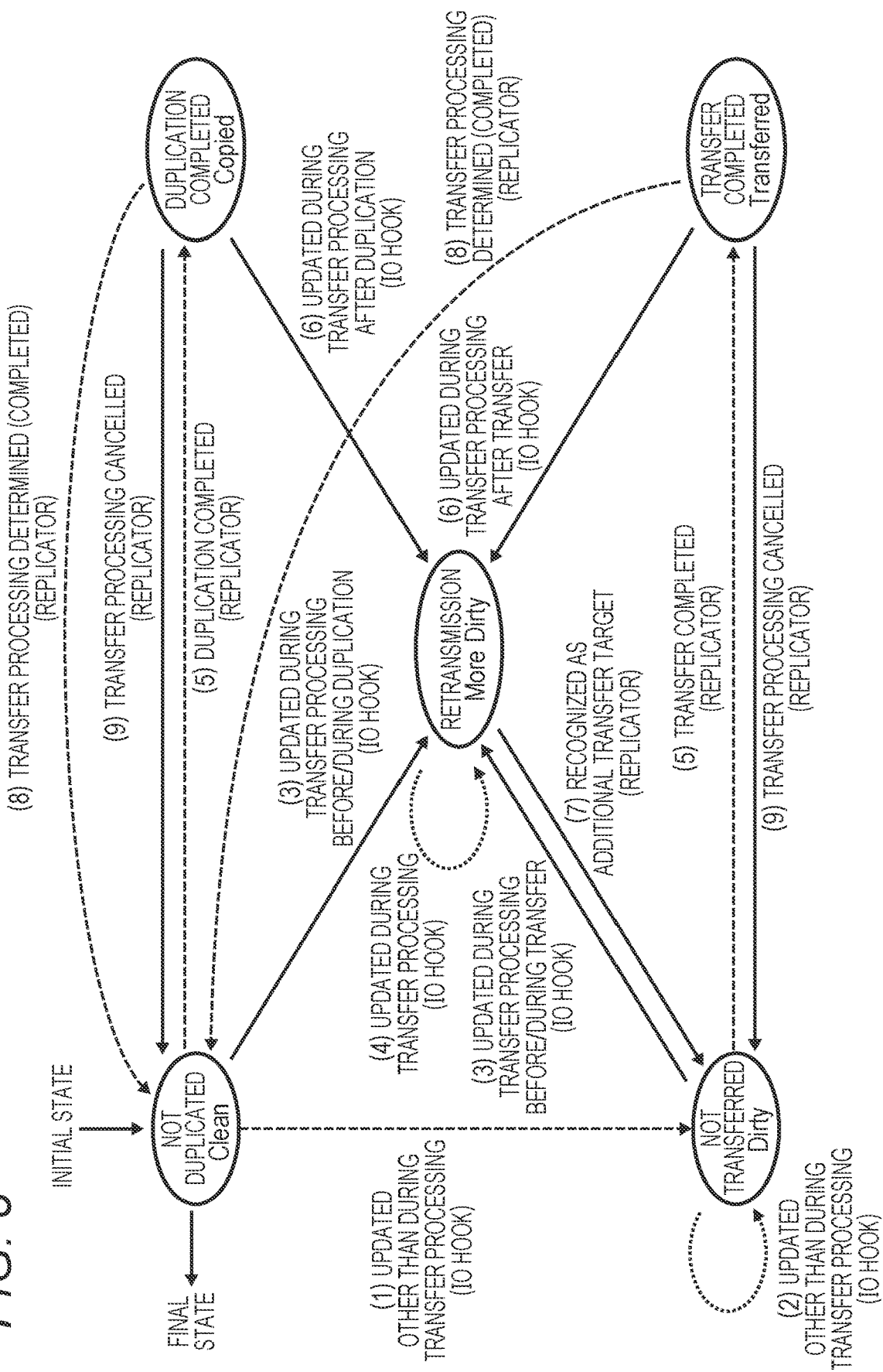
FIG. 8 is a transition diagram of a state flag in a part and an offset.

FIG. 8 is a transition diagram of the state flag in the offset and the part. Strictly speaking, FIG. 8 is a transition diagram of the state flag when the transfer mode of the MPU is "accomplishment". As described above, the state flag of the file takes five states "Clean", "Copied", "Transferred", "Dirty", and "More Dirty". In FIG. 8, the state transition arrows are denoted by the numbers (1) to (9), but this is merely for convenience of description, and the magnitude of the number is irrelevant to the order of transition, the priority order of transition, and the like.

When the state flag is "Clean" and there is an update in the offset and the part other than during the transfer processing, the IO hook program 234 causes the state flag of the offset and the part to transition to "Dirty" as illustrated in (1). When the offset and the part are updated other than during the transfer processing in a state where the state flag is "Dirty", the state flag of the offset and the part is maintained at "Dirty" by the IO hook program 234 as illustrated in (2). When the state flag is "Clean" or "Dirty", when the MPU of the file to which the offset and the part belong is being executed and there is an update before the transmission or during the transmission of the offset and the part, the IO hook program 234 causes the state flag of the offset and the part to transition to "More Dirty" as illustrated in (3).

When the offset and the part are updated during the transfer processing of the offset and the part in a state where the state flag is "More Dirty", the IO hook program 234 maintains the state flag of the offset and the part at "More Dirty" as illustrated in (4). When the duplication processing or the transfer processing of the offset and the part is completed in a state where the state flag is "Clean" or "Dirty", the replicator 236 updates the state flag of the file to "Copied" or "Transferred" as illustrated in (5). In a state where the state flag is "Copied" or "Transferred", when the MPU of the file to which the offset and the part belong is being executed and there is an update after the transmission of the offset and the part, the IO hook program 234 causes the state flag of the offset and the part to transition to "More Dirty" as illustrated in (6).

When the offset and part are recognized as an offset and part that needs to be retransmitted in a state where the state flag is "More Dirty", the replicator 236 causes the state flag of the offset and the part to transition to "Dirty" as illustrated in (7). When the MPU of the file to which the offset and the part belong is completed in a state where the state flag is "Copied" or "Transferred", the replicator 236 causes the state flag of the offset and the part to transition to "Clean" as illustrated in (8). When the MPU of the file to which the offset and the part belong is canceled in a state where the state flag is "Copied" or "Transferred", the replicator 236 causes the state flag of the offset and the part to transition to "Clean" or "Dirty" as illustrated in (9).

Figure 9:
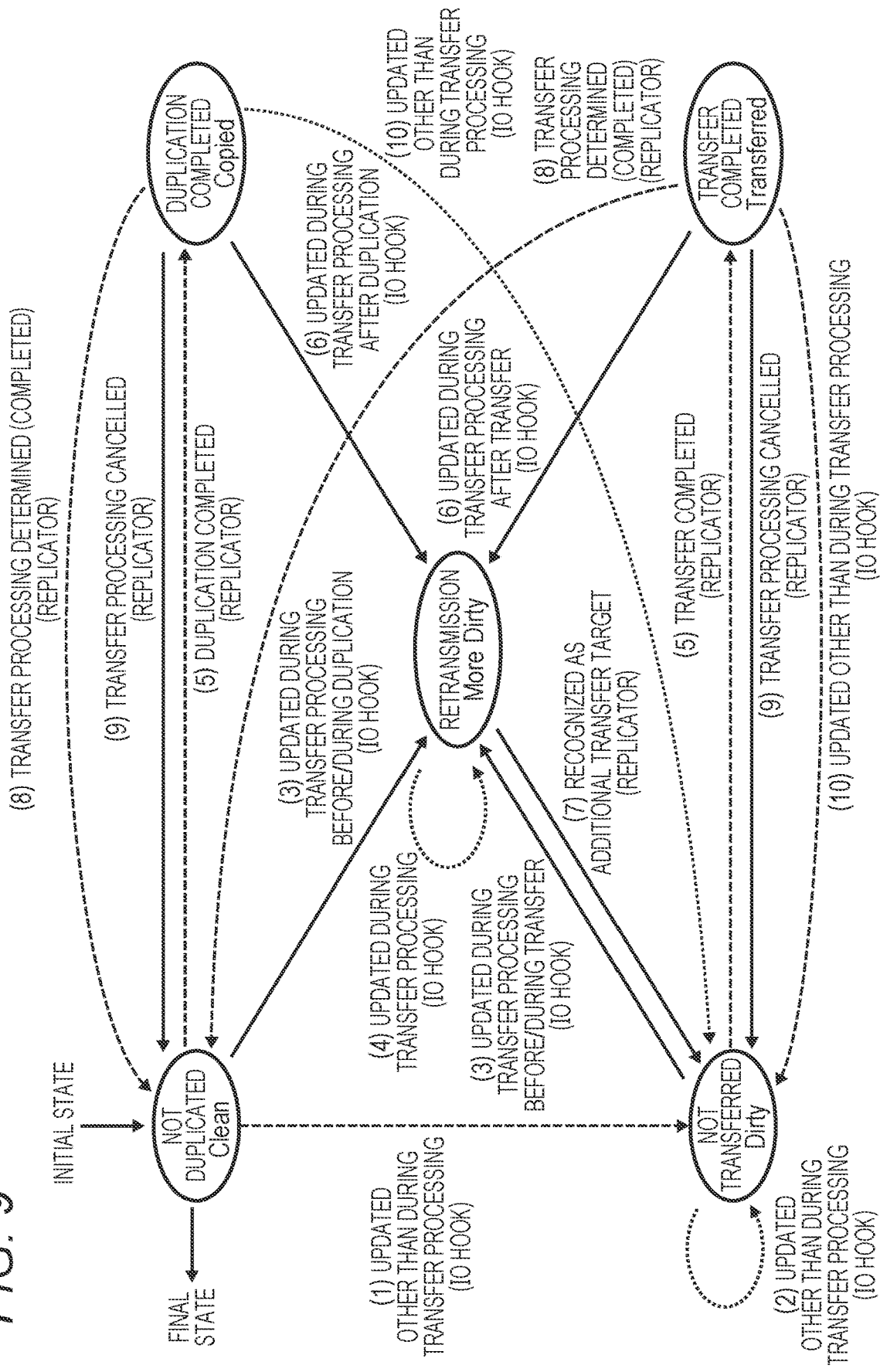
FIG. 9 is a transition diagram of a state flag in an offset and a part in a case where a transfer mode of an MPU is other than "accomplishment"

FIG. 9 is a transition diagram of the state flag in the offset and the part in a case where the transfer mode of the MPU is other than "accomplishment". The difference between FIGS. 8 and 9 is that (10) is added. Other than that, there is no difference between the two. When the offset and the part are updated other than during the transfer processing in a state where the state flag is "Copied" or "Transferred", the IO hook program 234 causes the state flag of the offset and the part to transition to "Dirty" as illustrated in (10).

Figure 10:
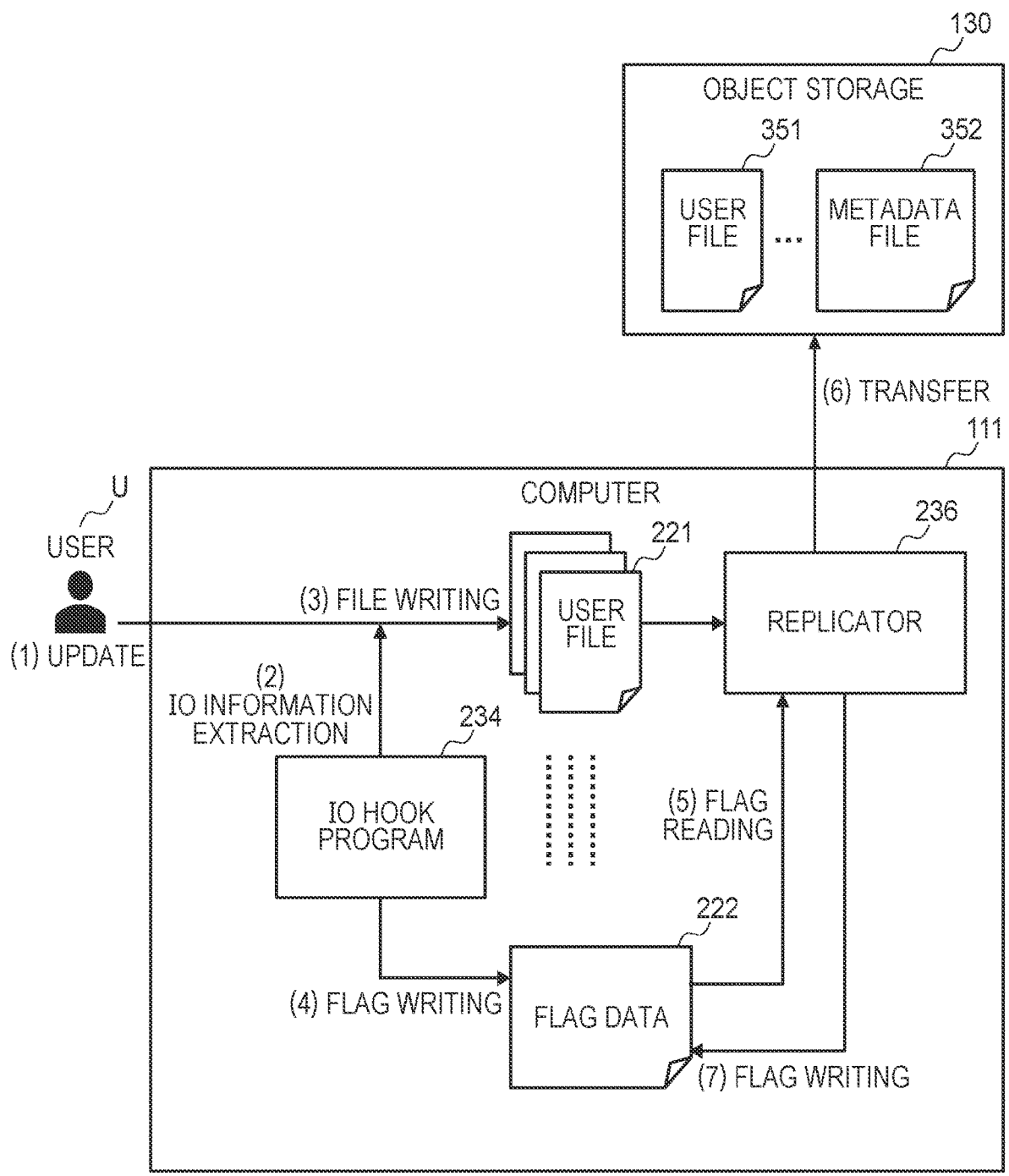
FIG. 10 is a schematic diagram illustrating an MPU of a user file.

FIG. 10 is a schematic diagram illustrating MPU of a user file 221. First, as illustrated in (1), the user U updates the user file 221 stored in the computer 111. This update is, for example, editing of a file using a mouse or a keyboard. As shown in (3), writing is performed on the user file 221. As shown in (2), the IO hook program 234 extracts IO information associated with the writing, and rewrites the state flag of the file, part, and offset to which the writing has been performed in the flag data 222.

The replicator 236 reads the state flag from the flag data 222 as shown in (5) at regular time intervals, and transfers the updated file to the object storage 130 by the MPU as shown in (6). When the transfer is completed, the replicator 236 writes a state flag in the flag data 222 as the transfer is completed as shown in (7).

Figure 11:
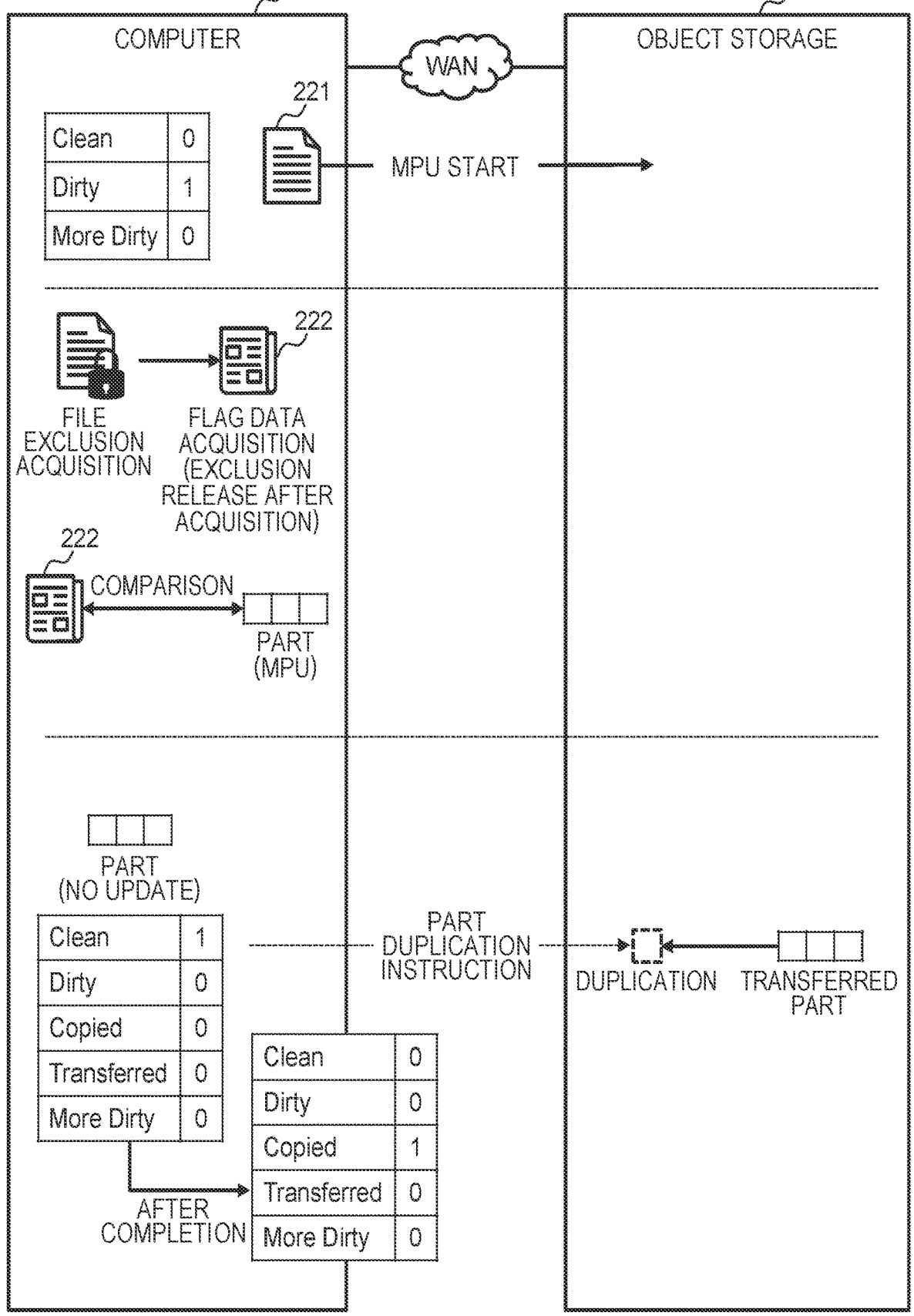
FIG. 11 is a conceptual operational diagram of the MPU.

FIGS. 11 to 15 are conceptual operational diagrams of the MPU. As illustrated in FIG. 11, the MPU is started with a certain updated user file 221 as a target file which is a file to be transferred. At this time, the state flag of the target file is set to "Dirty". When the MPU is started, a file lock is first applied to the target file, a copy of the flag data 222 is acquired, and then, for example, the lock is released. Then, the necessity of transfer to the object storage 130 is determined for each part that is a unit of transfer. That is, the flag data 222 does not need to include the part flag 224, and the part flag 224 does not need to be created based on the offset flag 225 at this timing.

In the target file, the state flag of a part that has not been written since the previous MPU is "Clean". The replicator 236 instructs the object storage 130 to duplicate the part using the transferred user file 351. When the duplication is completed, the state flag of the part is updated to "Copied".

Figure 12:
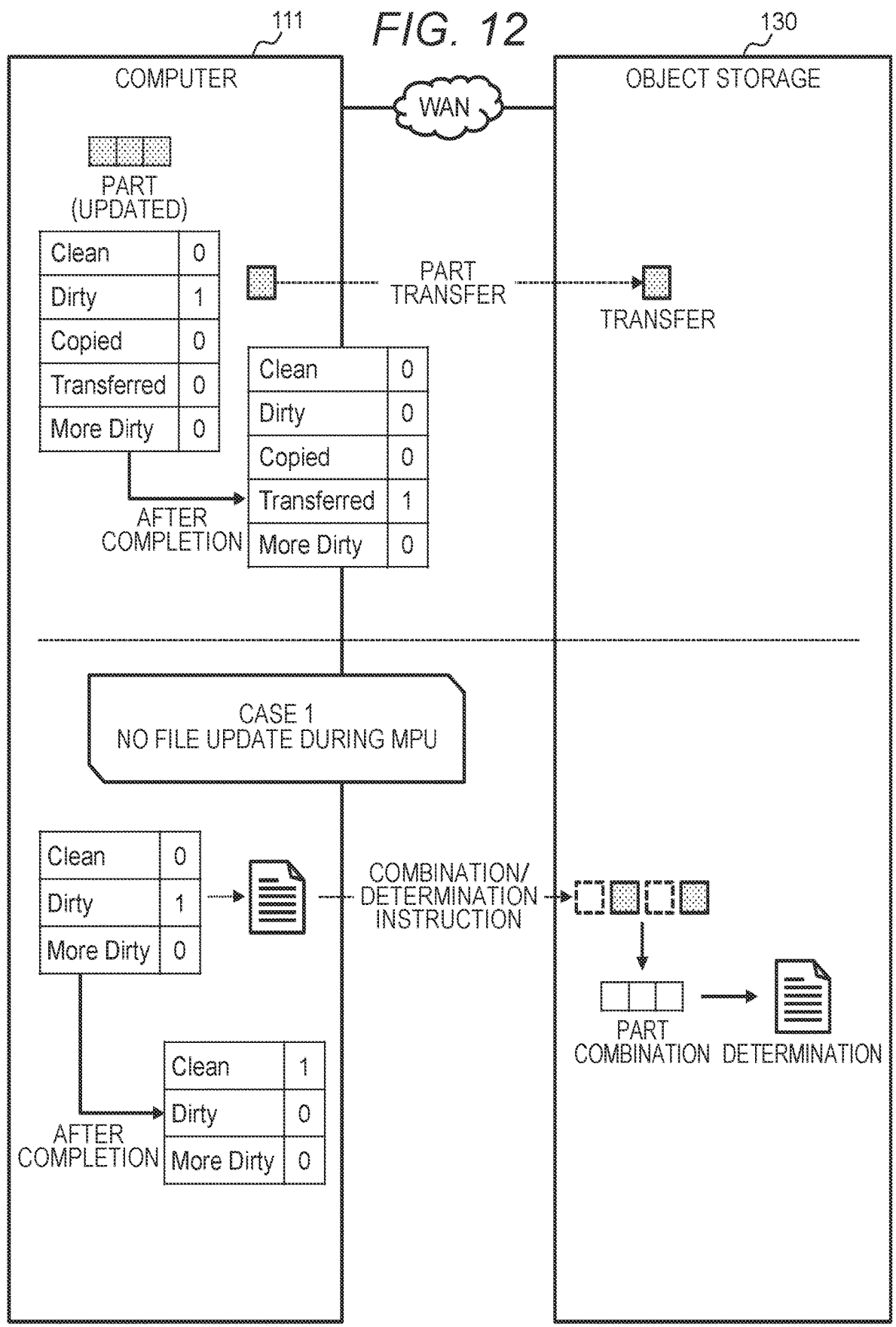
FIG. 12 is a conceptual operational diagram of the MPU.

The description will be continued with reference to FIG. 12. The state flag of a part written after the previous MPU is "Dirty". The replicator 236 transfers the part to the object storage 130, and when the transfer is completed, the state flag of the part is updated to "Transferred". Next, a case 1 and a case 2 will be described separately. The case 1 is a case where the target file is not updated during the MPU. In this case, when duplication or transfer of all parts is completed, the replicator 236 issues an instruction of combination and determination to the object storage 130. The object system program 331 of the object storage 130 that has received the instruction combines the duplicated part and the transferred part in response to the instruction, and determines the MPU. The replicator 236 further updates the state flag of the target file from "Dirty" to "Clean".

Figure 13:
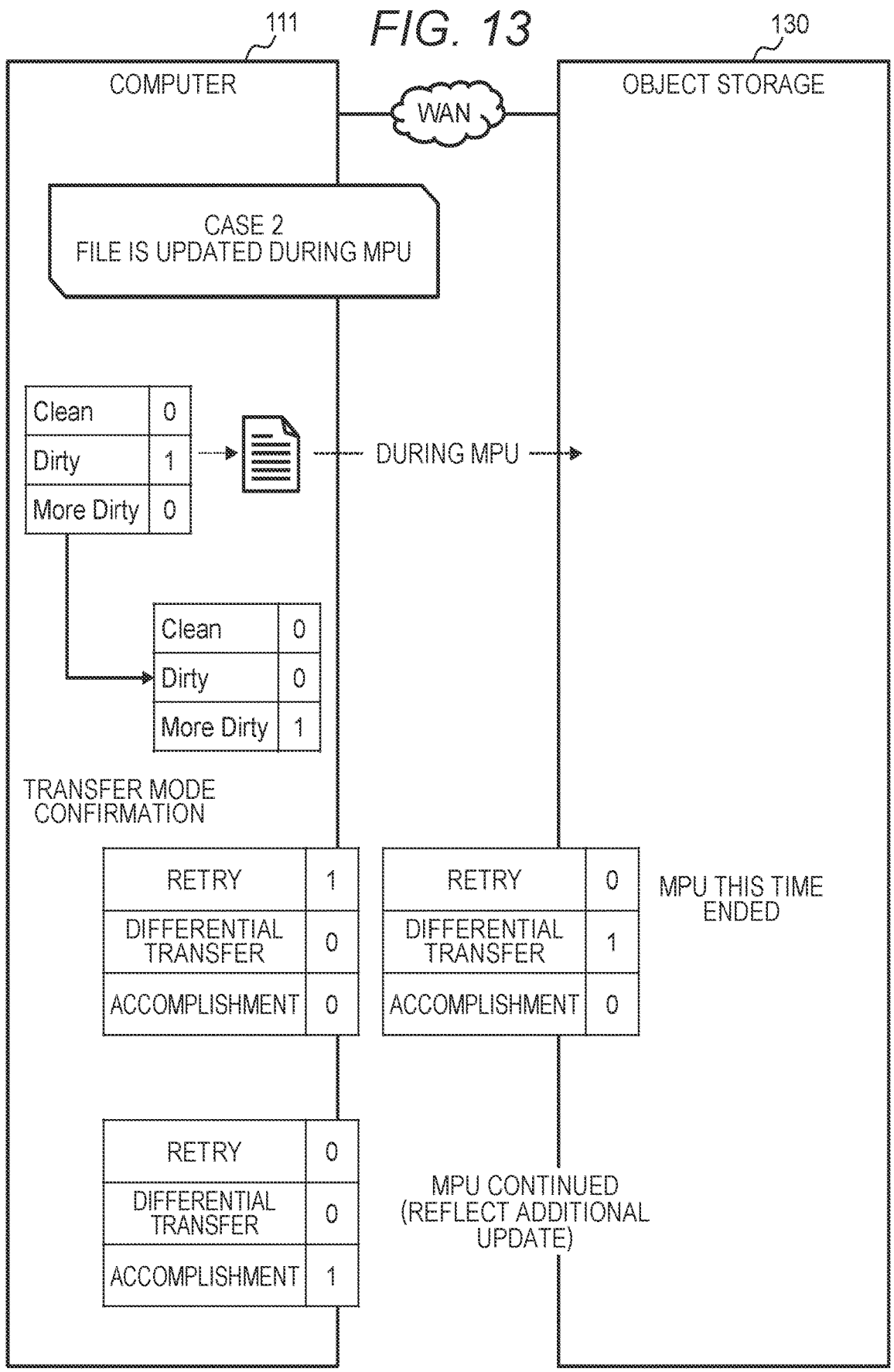
FIG. 13 is a conceptual operational diagram of the MPU.

The description will be continued with reference to FIG. 13. The case 2 is a case where the target file is updated during the MPU. In this case, the handling differs depending on the value of the transfer mode set in advance. When the transfer mode is "retry" and "differential transfer", the current MPU is ended, and when the transfer mode is "accomplishment", the MPU is continued to reflect the additional update as described below.

Figure 14:
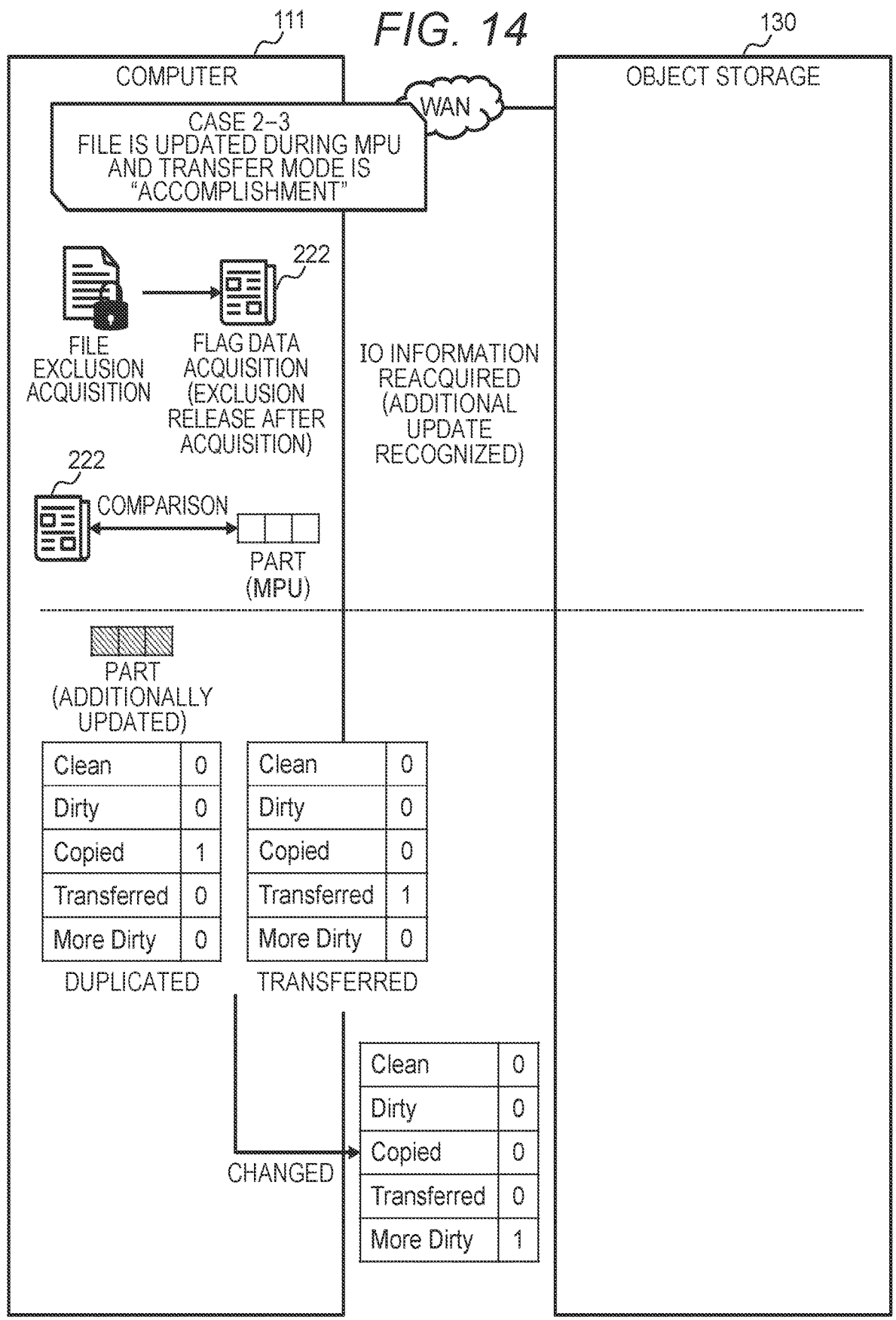
FIG. 14 is a conceptual operational diagram of the MPU.
Figure 15:
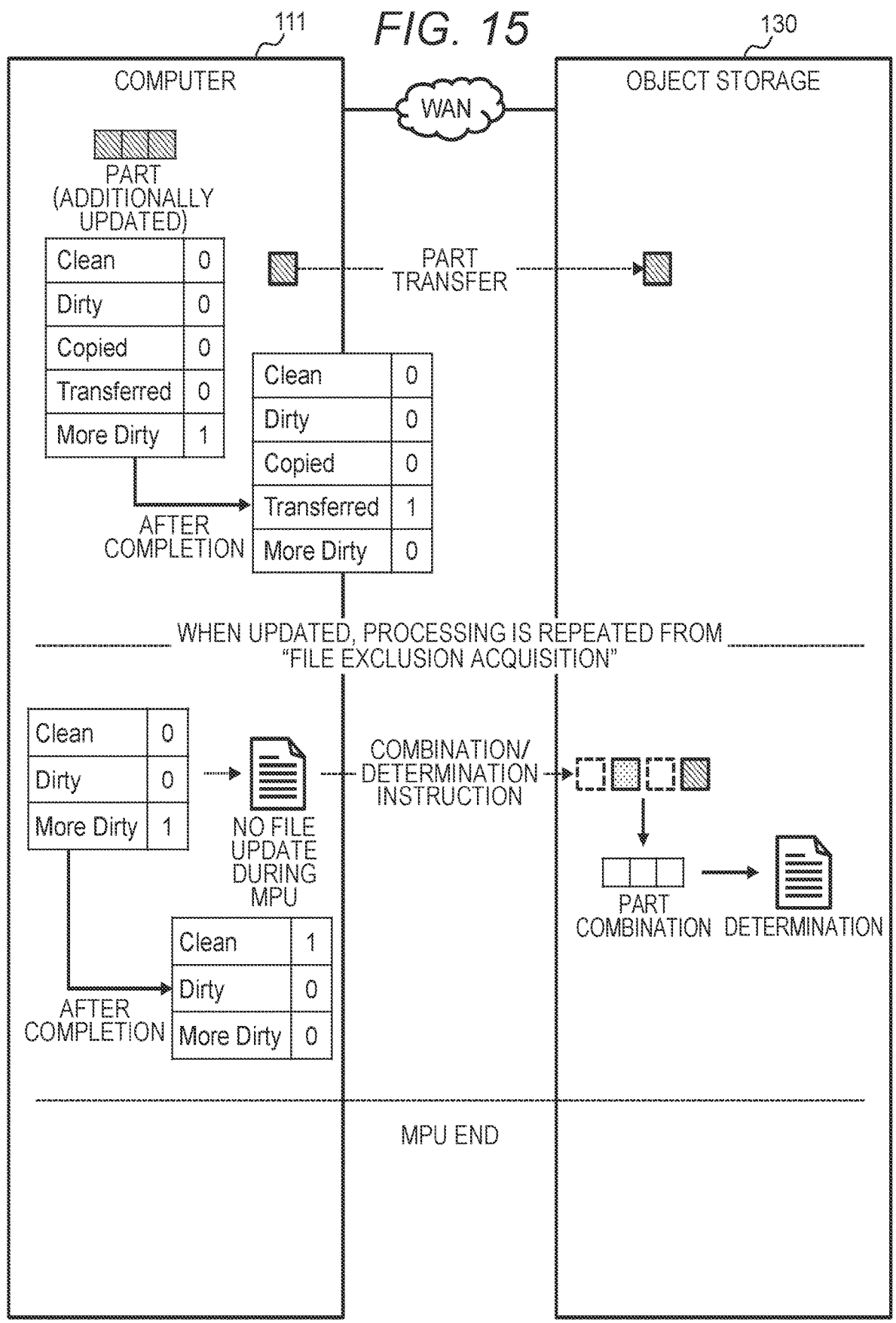
FIG. 15 is a conceptual operational diagram of the MPU.

The description will be continued with reference to FIG. 14. FIGS. 14 and 15 illustrate processing when the target file is updated during the MPU and the transfer mode is "accomplishment". In this case, the file lock is applied to the target file again, and the lock is released after the copy of the flag data 222 is acquired again. Then, the necessity of the additional transfer to the object storage 130 is determined for each part. The state flag of a part that requires additional transfer is updated from "Copied" or "Transferred" to "More Dirty".

The description will be continued with reference to FIG. 15. When a part that requires additional transfer is transferred to the object storage 130, the state flag of the part is updated from "More Dirty" to "Transferred". When the target file is further updated before the MPU of the target file is completed, the processing is repeated from the file lock illustrated in the upper part of FIG. 14. When there is no update of the target file after the file lock and transfer and duplication of all parts are completed, the replicator 236 issues an instruction of combination and determination to the object storage 130. The object system program 331 of the object storage 130 that has received the instruction combines the duplicated part and the transferred part in response to the instruction, and determines the MPU. The replicator 236 further updates the state flag of the target file from "More Dirty" to "Clean".

Figure 16:
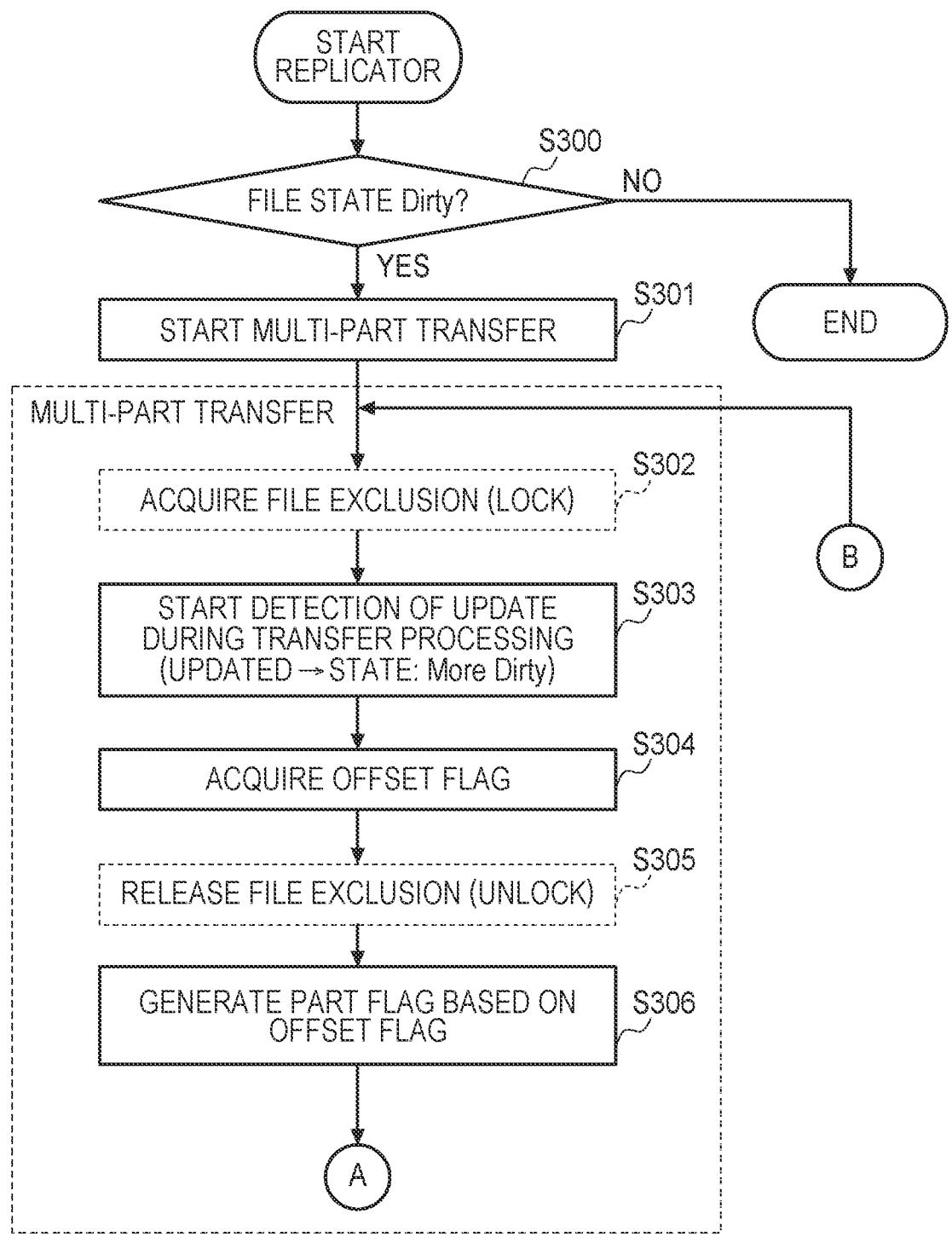
FIG. 16 is a flowchart illustrating processing of a replicator.
Figure 17:
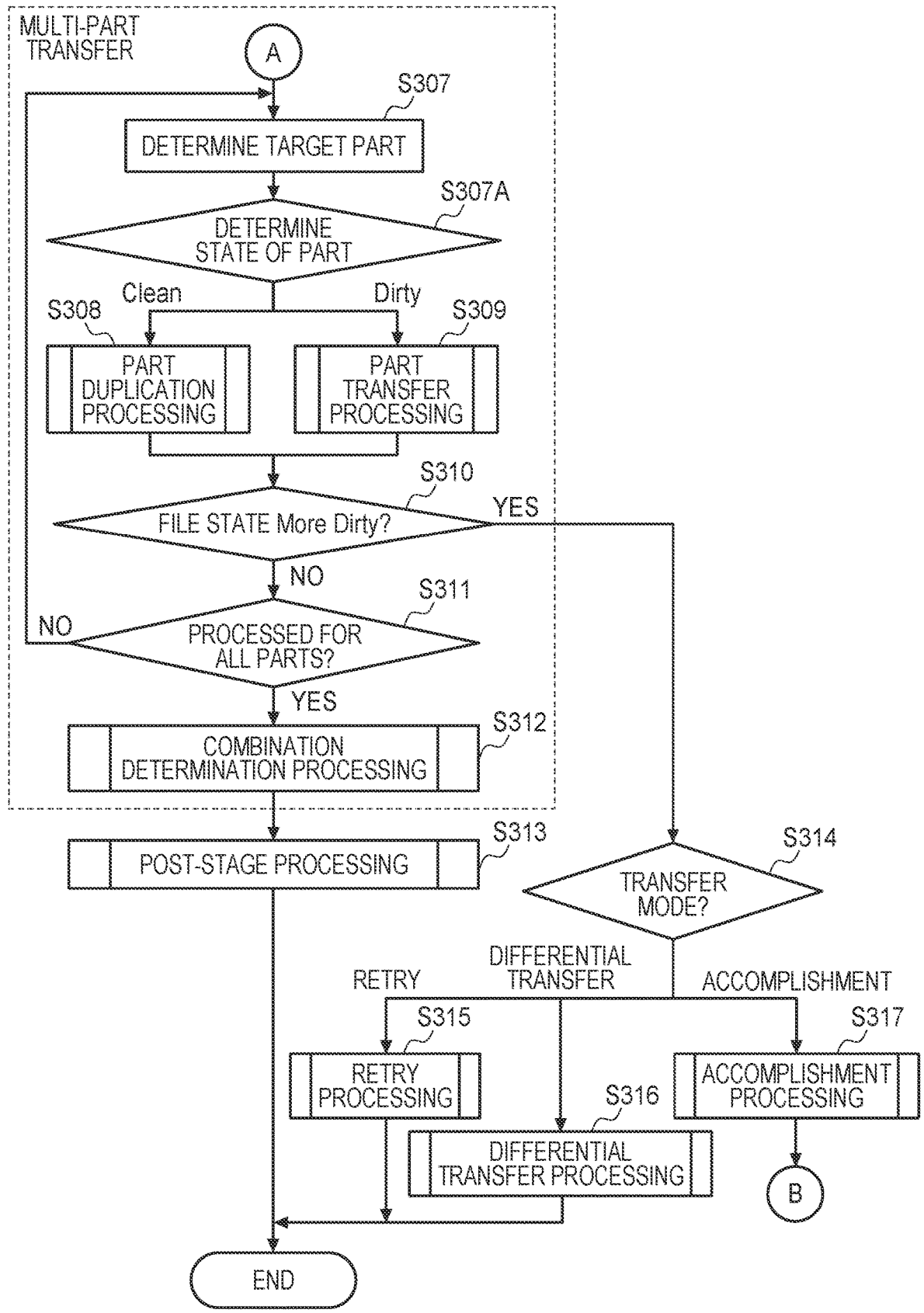
FIG. 17 is a flowchart illustrating processing of the replicator.

FIGS. 16 to 17 are flowcharts illustrating processing of the replicator 236. The processing is stored in the computer 111 at regular time intervals such as 5 minutes, and each of the updated user files 221 is sequentially executed on the target file. Whether the user file 221 is updated can be determined by referring to the file flag 223.

First, in step S300, the replicator 236 determines whether or not the state flag of the target file is "Dirty". When determining that the state flag of the target file is "Dirty", the replicator 236 proceeds to step S301, and when determining that the state flag of the target file is not "Dirty", that is, is "Clean", the replicator ends the processing illustrated in FIG. 16. Note that the state flag of the file includes "More Dirty", but "More Dirty" is a state flag that can be taken only for a short time during execution of the MPU. In addition, since the previous MPU is completed at the timing when the processing illustrated in FIG. 16 is executed, the state flag does not take "More Dirty" at the determination timing of step S300.

In step S301, the replicator 236 starts multi-part transfer of the target file and proceeds to step S302. In step S302, the replicator 236 acquires the exclusion of the target file. In subsequent step S303, the replicator 236 starts detecting update during transfer processing. When the IO hook program 234 detects update of the offset in the target file by Step S303, the offset is caused to transition to "More Dirty". In the subsequent step S304, the replicator 236 acquires the offset flag 225 of the target file, and in the subsequent step S305, releases the exclusion of the target file.

In the subsequent step S306, the replicator 236 generates the part flag 224 on the basis of the offset flag 225 acquired in step S304, and recognizes a part to be updated. As the state flag of each part in the part flag 224, a value of a state flag having the highest priority among offset state flags in an address range of a predetermined part is adopted. Upon completion of the processing in step S306, the replicator 236 proceeds to FIG. 17 via circled A.

In FIG. 17, the processing is started from the circled A, and first, step S307 is executed. In step S307, the replicator 236 determines a target part which is a part to be processed. As the target part, any unprocessed part among the parts constituting the target file is selected. In the subsequent step S307A, the replicator 236 determines whether the state flag of the target part is "Clean" or "Dirty". The replicator 236 proceeds to step S308 when determining that the state flag of the target part is "Clean", and proceeds to step S309 when determining that the state flag of the target part is "Dirty". Details of steps S308 and S309 will be described later. When the execution of step S308 or step S309 is completed, the replicator 236 proceeds to step S310.

In step S310, the replicator 236 determines whether or not the state flag of the target file is "More Dirty". The replicator 236 proceeds to step S314 when determining that the state flag of the target file is "More Dirty", and proceeds to step S311 when determining that the state flag of the target file is not "More Dirty". In step S311, the replicator 236 determines whether or not all parts of the target file have been processed, that is, whether or not the target part has been determined in step S307. The replicator 236 proceeds to step S312 when determining that all parts of the target file have been processed, and returns to step S307 when determining that at least one part of the target file has not been processed. In step S312, the replicator 236 executes combination determination processing to be described later, and in the subsequent step S313, the replicator 236 executes post-stage processing to be described later and ends the processing illustrated in FIG. 17.

In step S314, the replicator 236 determines the set transfer mode. The replicator 236 proceeds to step S315 when determining that the transfer mode is "retry", proceeds to step S316 when determining that the transfer mode is "differential transfer", and proceeds to step S317 when determining that the transfer mode is "accomplishment". In step S315, the replicator 236 executes retry processing to be described later and ends the processing illustrated in FIG. 17. In step S316, the replicator 236 executes differential transfer processing to be described later and ends the processing illustrated in FIG. 17. In step S317, the replicator 236 executes accomplishment processing to be described later, and returns to step S302 in FIG. 16 via circled B.

Figure 18:
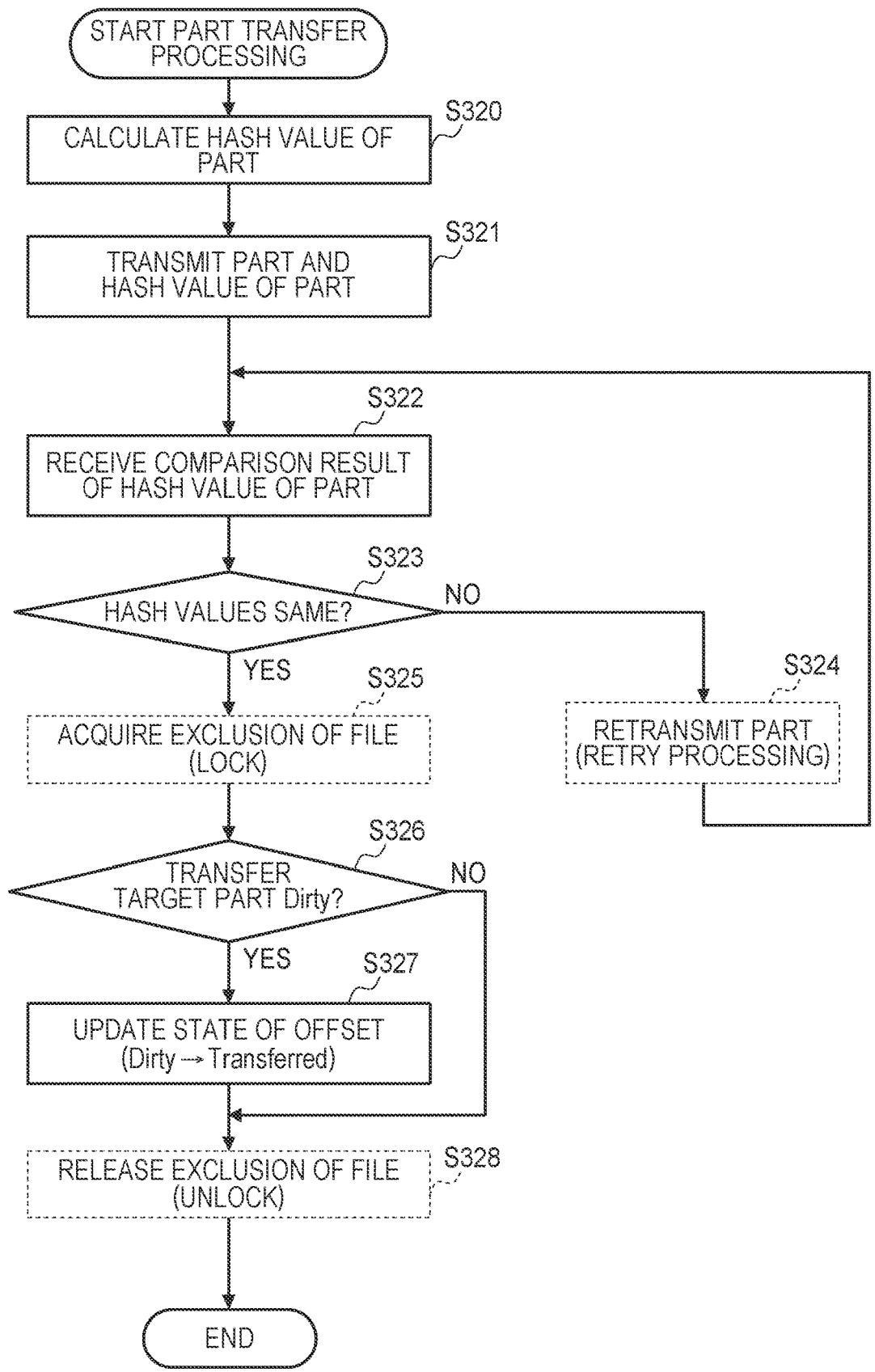
FIG. 18 is a flowchart illustrating part transfer processing illustrated in step S309 of FIG. 17.

FIG. 18 is a flowchart illustrating part transfer processing illustrated in step S309 of FIG. 17. Before this processing is started, a transfer target part that is the part to be transferred is determined in advance.

In step S320, the replicator 236 calculates a hash value of the transfer target part using the hash processing program 233. In the subsequent step S321, the replicator 236 transmits the transfer target part and the hash value calculated in step S320 to the object storage 130. In the subsequent step S322, the replicator 236 receives a comparison result of the hash value of the transfer target part from the object storage 130.

In other words, in this step, the content of the comparison result received in step S322 is determined. The replicator 236 proceeds to step S325 when determining that the hash values are the same, and proceeds to step S324 when determining that the hash values are different. In step S324, the replicator 236 performs retry processing, that is, retransmits the transfer target part, and returns to step S322.

In step S325, the replicator 236 acquires exclusion of the file including the transfer target part and proceeds to step S326. In step S326, the replicator 236 determines whether or not the state flag of the transfer target part is "Dirty". The replicator 236 proceeds to step S327 when determining that the state flag of the transfer target part is "Dirty", and proceeds to step S328 when determining that the state flag is not "Dirty", that is, is "More Dirty". In step S327, the replicator 236 updates the state flag of the offset included in the transfer target part from "Dirty" to "Transferred", and proceeds to step S328. In step S327, the replicator 236 releases the exclusion of the file including the transfer target part and ends the processing illustrated in FIG. 18. Note that the file is locked in step S325 in order to avoid occurrence of writing during the processing in steps S326 to S327.

Figure 19:
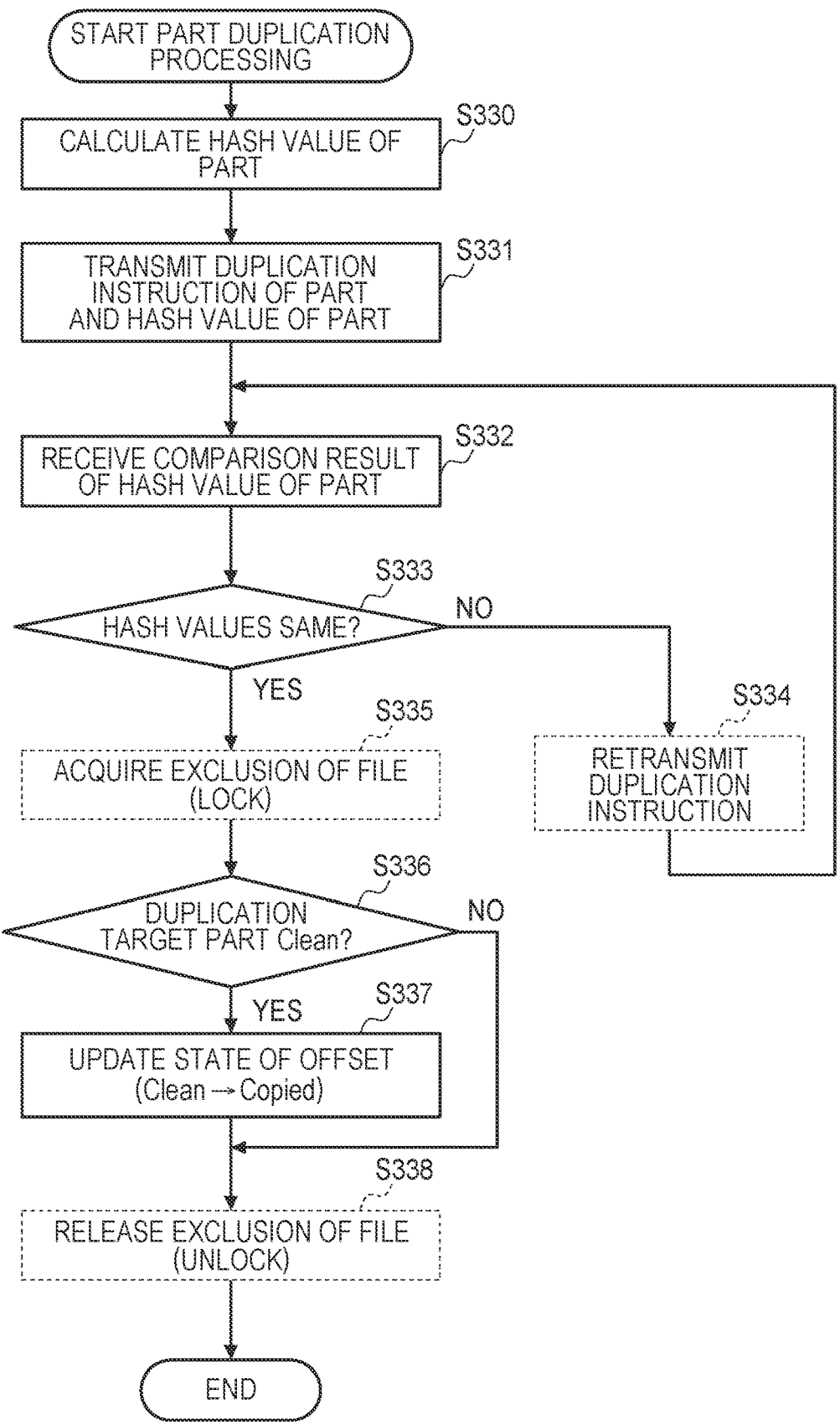
FIG. 19 is a flowchart illustrating part duplication processing illustrated in step S308 of FIG. 17.

FIG. 19 is a flowchart illustrating the part duplication processing illustrated in step S308 of FIG. 17. Before this processing is started, a duplication target part which is a part to be duplicated is determined in advance. Note that, since the replicator 236 instructs the object storage 130 to duplicate a part as described below, it can also be referred to as a "duplication instruction unit".

In step S330, the replicator 236 calculates a hash value of the duplication target part. In the subsequent step S331, the replicator 236 transmits a duplication instruction of the duplication target part and the hash value calculated in step S330 to the object storage 130. In the subsequent step S332, the replicator 236 receives the comparison result of the hash value of the duplication target part from the object storage 130.

In the subsequent step S333, the replicator 236 determines whether or not the hash values are the same. In other words, in this step, the content of the comparison result received in step S332 is determined. The replicator 236 proceeds to step S335 when determining that the hash values are the same, and proceeds to step S334 when determining that the hash values are different. In step S334, the replicator 236 performs retry processing, that is, retransmits the duplication instruction, and returns to step S332.

In step S335, the replicator 236 acquires the exclusion of the file including the duplication target part and proceeds to step S336. In step S336, the replicator 236 determines whether or not the state flag of the duplication target part is "Clean". The replicator 236 proceeds to step S337 when determining that the state flag of the duplication target part is "Clean", and proceeds to step S338 when determining that the state flag is not "Clean", that is, is "More Dirty". In step S337, the replicator 236 updates the state flag of the offset included in the duplication target part from "Clean" to "Copied", and proceeds to step S338. In step S337, the replicator 236 releases the exclusion of the file including the duplication target part and ends the processing illustrated in FIG. 19. Note that the file is locked in step S325 in order to avoid occurrence of writing during the processing in steps S336 to S337.

Figure 20:
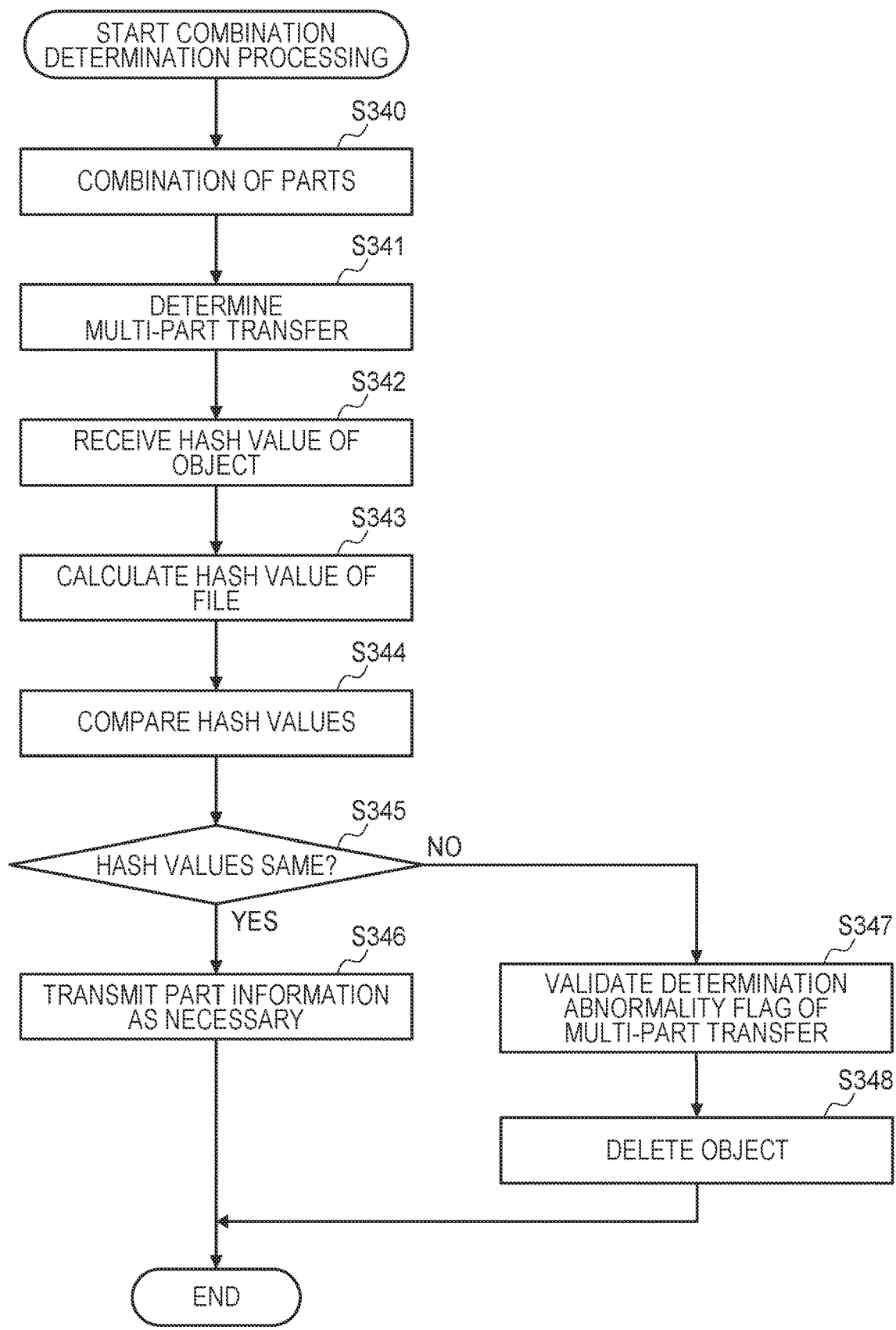
FIG. 20 is a flowchart illustrating combination determination processing illustrated in step S312 of FIG. 17.

FIG. 20 is a flowchart illustrating the combination determination processing illustrated in step S312 of FIG. 17. First, in step S340, the replicator 236 combines the parts to generate a file. In the subsequent step S341, the replicator 236 determines the multi-part transfer. The processing of this step is processing to make a pair with S301 in FIG. 16. In the subsequent step S342, the replicator 236 receives the hash value of the object from the computer 111. In the subsequent step S343, the replicator 236 calculates a hash value of the file obtained by combining in step S340. In the subsequent step S344, the replicator 236 compares the hash value received in step S342 with the hash value calculated in step S343.

In the subsequent step S345, the replicator 236 determines whether or not the hash values are the same, in other words, the result of the comparison in step S344. The replicator 236 proceeds to step S346 when determining that the two hash values are the same, and proceeds to step S347 when determining that the two hash values are different. In step S346, the replicator 236 transmits part information to the object storage 130 as necessary, and ends the processing illustrated in FIG. 20. In step S347, the replicator 236 validates the determination abnormality flag of the multi-part transfer. In the subsequent step S348, the replicator 236 deletes the object and ends the processing illustrated in FIG. 20.

Figure 21:
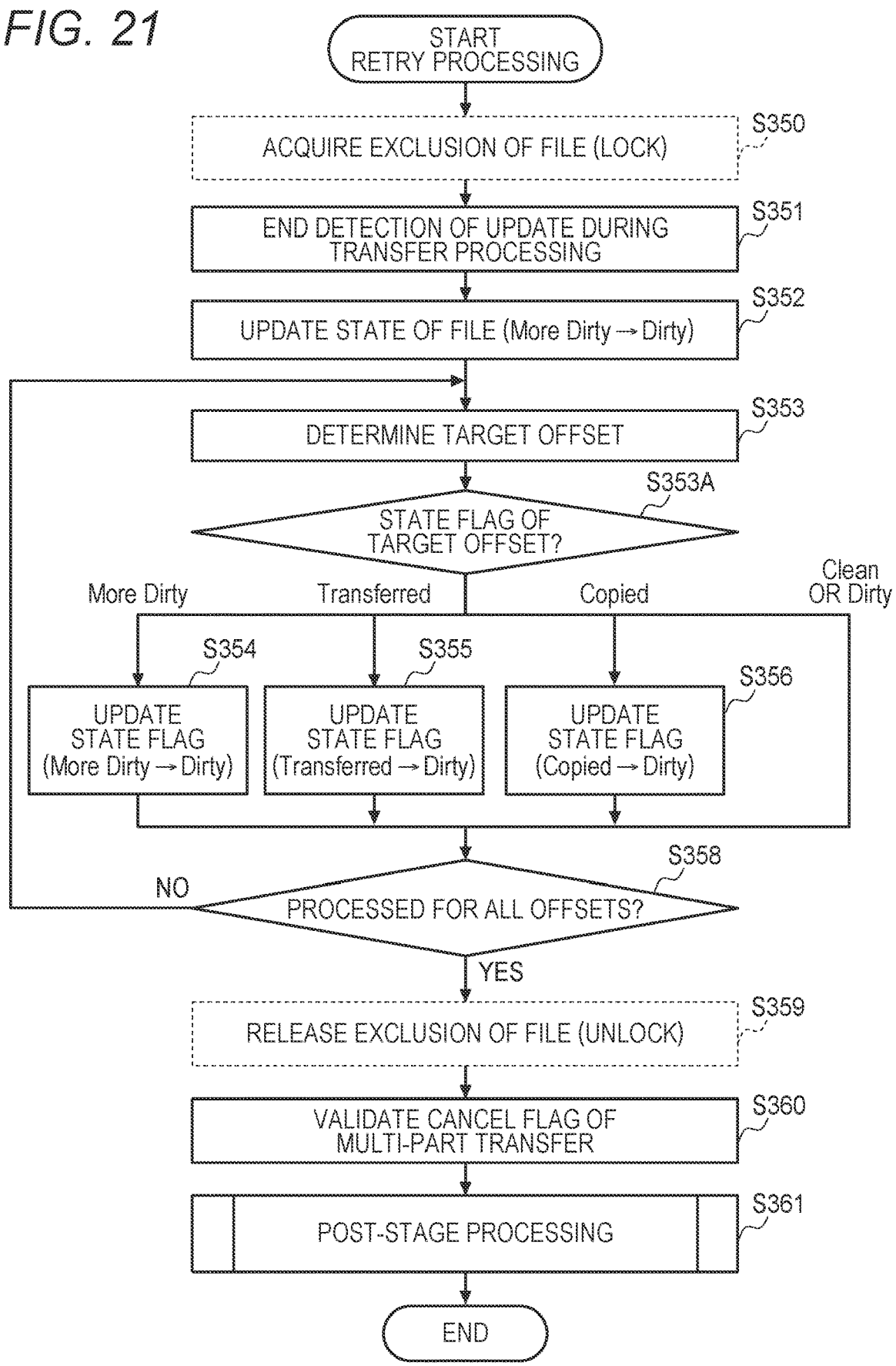
FIG. 21 is a flowchart illustrating retry processing illustrated in step S315 of FIG. 17.

FIG. 21 is a flowchart illustrating the retry processing illustrated in step S315 of FIG. 17. First, in step S350, the replicator 236 acquires exclusion of the target file. In the subsequent step S351, the replicator 236 ends the detection of the update during the transfer processing, and proceeds to step S352. Step S351 is processing to make a pair with step S303, and when the IO hook program 234 detects update of the offset in the target file thereafter, the offset is caused to transition to not "More Dirty" but "Dirty". In the subsequent step S352, the replicator 236 updates the state flag of the target file from "More Dirty" to "Dirty", and proceeds to step S353.

In step S353, the replicator 236 determines a target offset. As the target offset, any unprocessed offset in the target file is determined. In the subsequent step S353A, the replicator 236 determines the value of the state flag of the target offset. The replicator 236 proceeds to S354 when determining that the state flag of the target offset is "More Dirty", proceeds to S355 when determining that the state flag is "Transferred", proceeds to S356 when determining that the state flag is "Copied", and proceeds to step S358 when determining that the state flag is "Clean" or "Dirty".

In step S354, the replicator 236 updates the state flag of the target offset from "More Dirty" to "Dirty", and proceeds to step S358. In step S355, the replicator 236 updates the state flag of the target offset from "Transferred" to "Dirty", and proceeds to step S358. In step S356, the replicator 236 updates the state flag of the target offset from "Copied" to "Dirty", and proceeds to step S358.

In step S358, the replicator 236 determines whether or not all the offsets included in the target file have been processed. The replicator 236 proceeds to step S359 when determining that all the offsets included in the target file have been processed, and returns to step S353 when determining that there is an unprocessed offset.

In step S359, the replicator 236 releases the exclusion of the target file. In the subsequent step S360, the replicator 236 validates a cancel flag of the multi-part transfer. In the subsequent step S361, the replicator 236 executes post-stage processing described later and ends the processing illustrated in FIG. 21. Note that this post-stage processing includes duplication and deletion of a transfer part.

Figure 22:
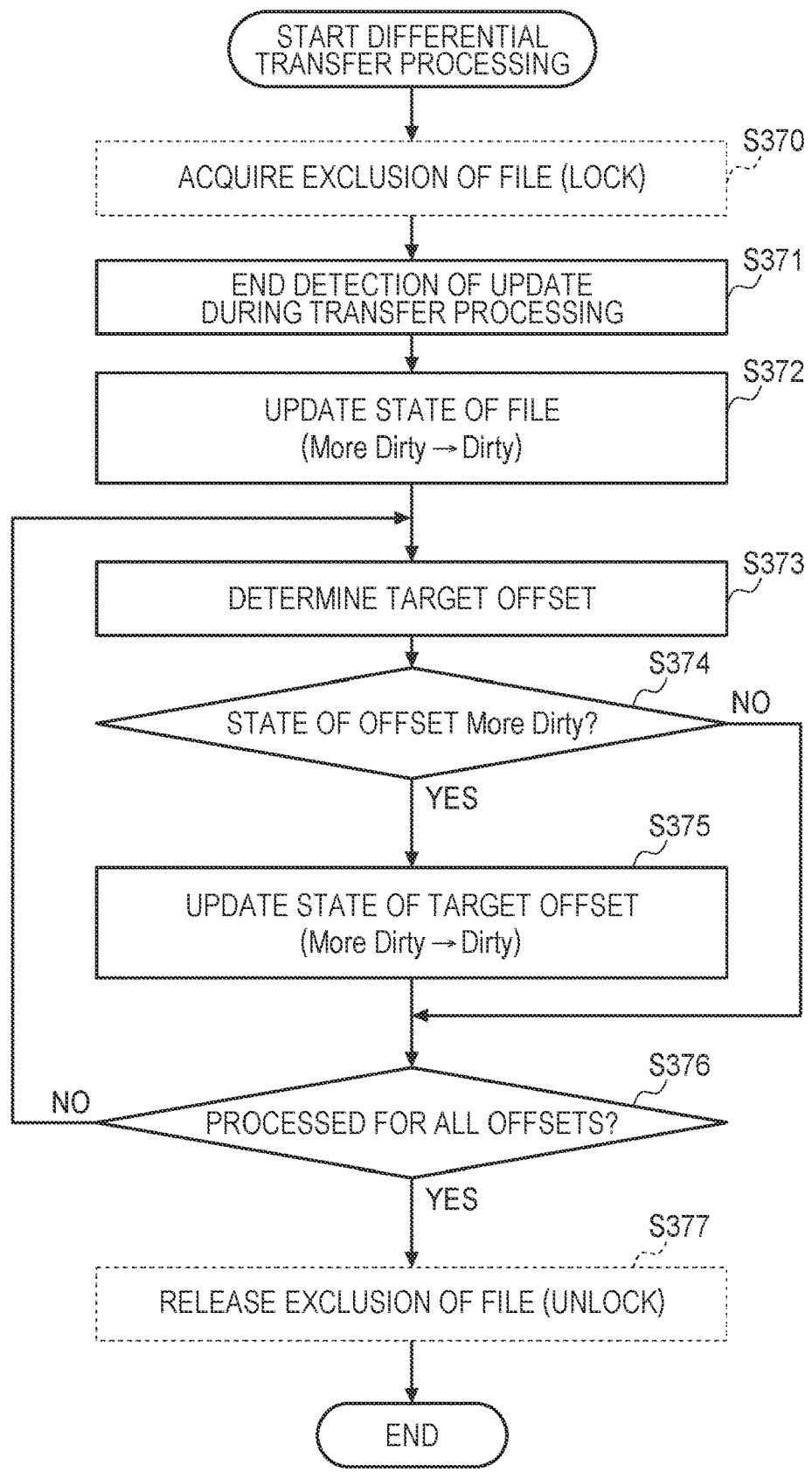
FIG. 22 is a flowchart illustrating differential transfer processing illustrated in S316 of FIG. 17.

FIG. 22 is a flowchart illustrating the differential transfer processing illustrated in S316 of FIG. 17. First, in step S370, the replicator 236 acquires exclusion of the target file. In the subsequent step S371, the replicator 236 ends the detection of update during the transfer processing, and proceeds to step S372. Step S371 is processing to make a pair with step S303, and when the IO hook program 234 detects update of the offset in the target file thereafter, the offset is caused to transition to not "More Dirty" but "Dirty". In the subsequent step S372, the replicator 236 updates the state flag of the target file from "More Dirty" to "Dirty", and proceeds to step S373.

In step S373, the replicator 236 determines a target offset. As the target offset, any unprocessed offset in the target file is determined. In the subsequent step S374, the replicator 236 determines whether or not the state flag of the target offset is "More Dirty". The replicator 236 proceeds to step S375 when determining that the state flag of the target offset is "More Dirty", and proceeds to step S376 when determining that the state flag of the target offset is not "More Dirty" without performing any special processing. In step S375, the replicator 236 updates the state flag of the target offset from "More Dirty" to "Dirty", and proceeds to step S376.

In step S376, the replicator 236 determines whether or not all the offsets of the target file have been processed. The replicator 236 proceeds to step S377 when determining that all the offsets of the target file have been processed, and returns to step S373 when determining that any offset of the target file has not been processed. In step S377, the replicator 236 releases the exclusion of the target file and ends the processing illustrated in FIG. 22.

Figure 23:
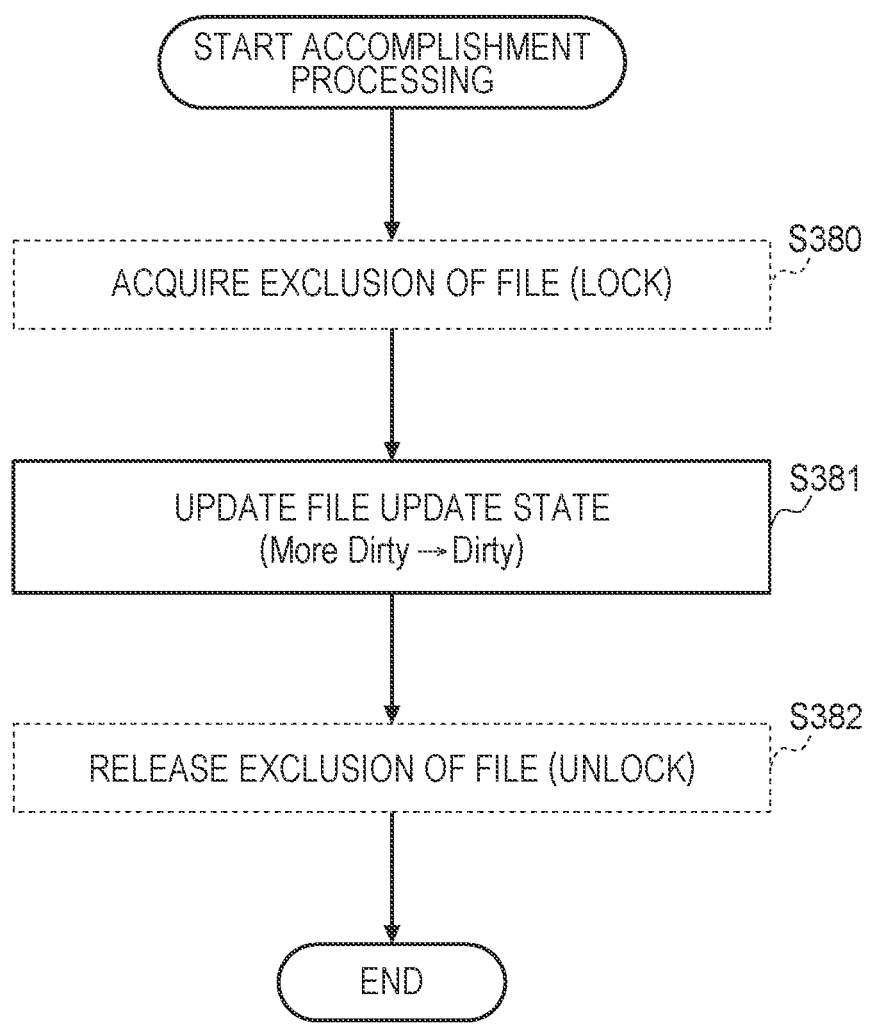
FIG. 23 is a flowchart illustrating accomplishment processing illustrated in S317 of FIG. 17.

FIG. 23 is a flowchart illustrating accomplishment processing illustrated in S317 of FIG. 17. First, in step S380, the replicator 236 acquires exclusion of the target file. In the subsequent step S381, the replicator 236 updates the state flag of the target file from "More Dirty" to "Dirty". In the subsequent step S382, the replicator 236 releases the exclusion of the target file and ends the processing illustrated in FIG. 23.

Figure 24:
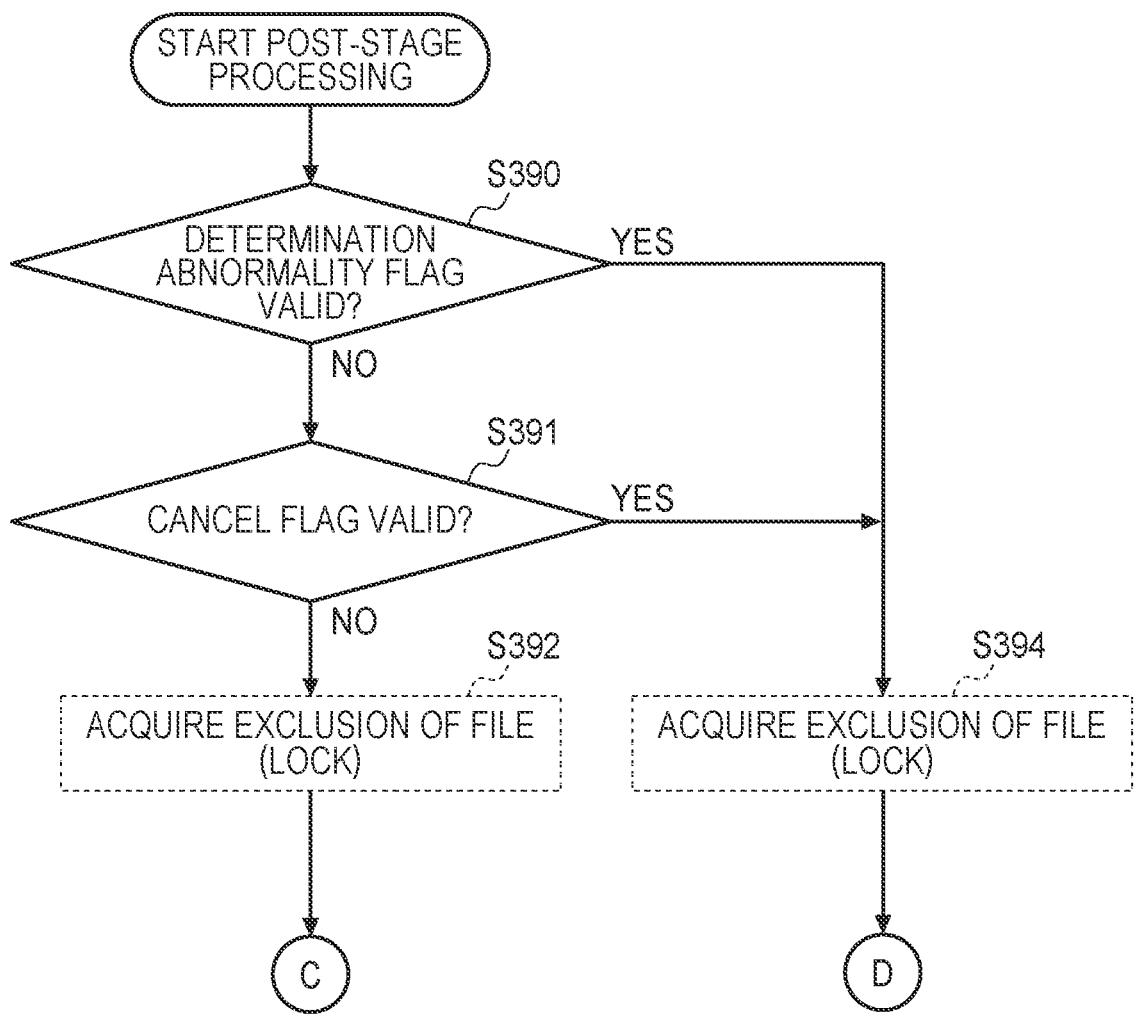
FIG. 24 is a flowchart illustrating post-stage processing illustrated in step S313 in FIG. 17.
Figure 25:
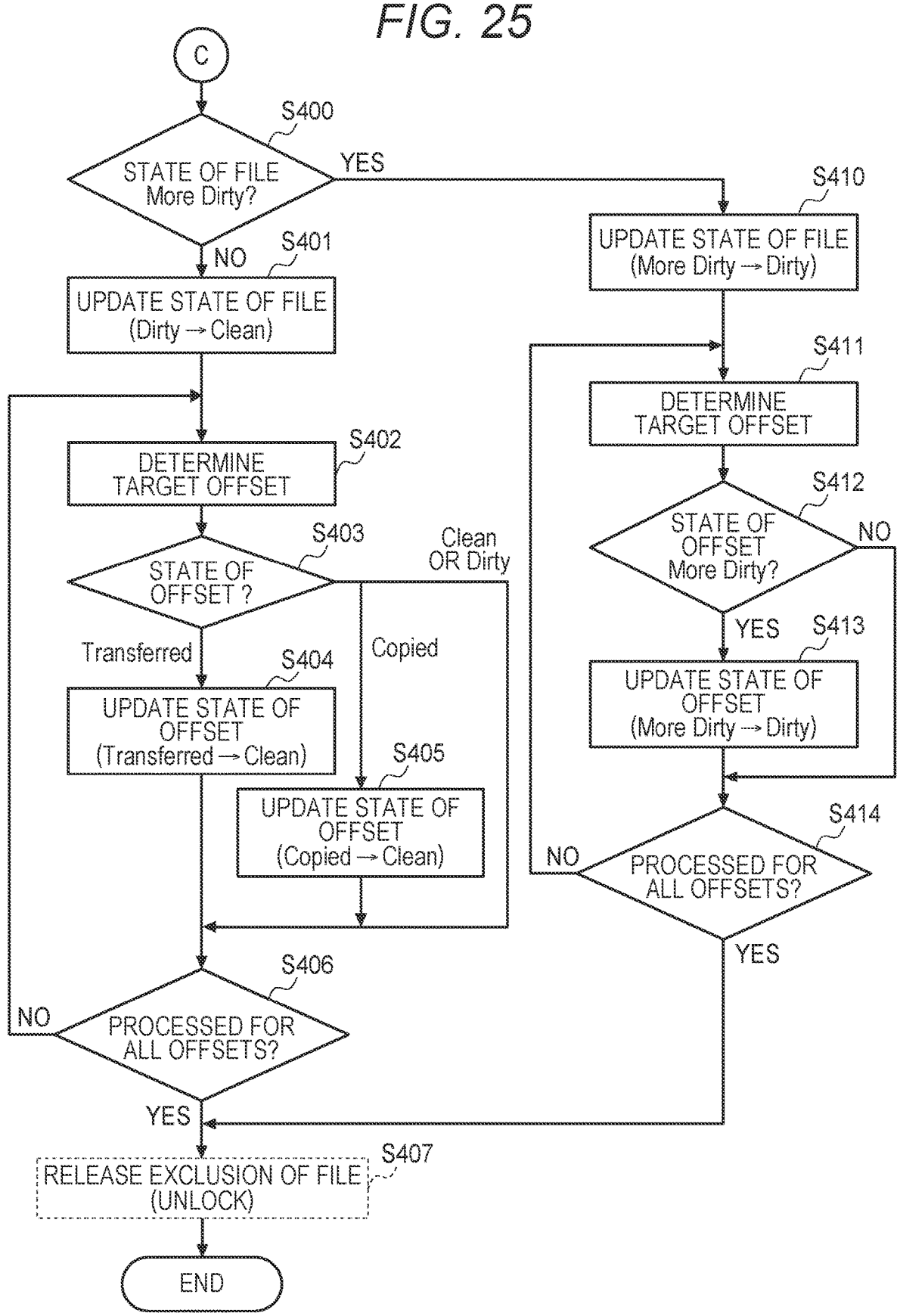
FIG. 25 is a flowchart illustrating post-stage processing illustrated in step S313 in FIG. 17.
Figure 26:
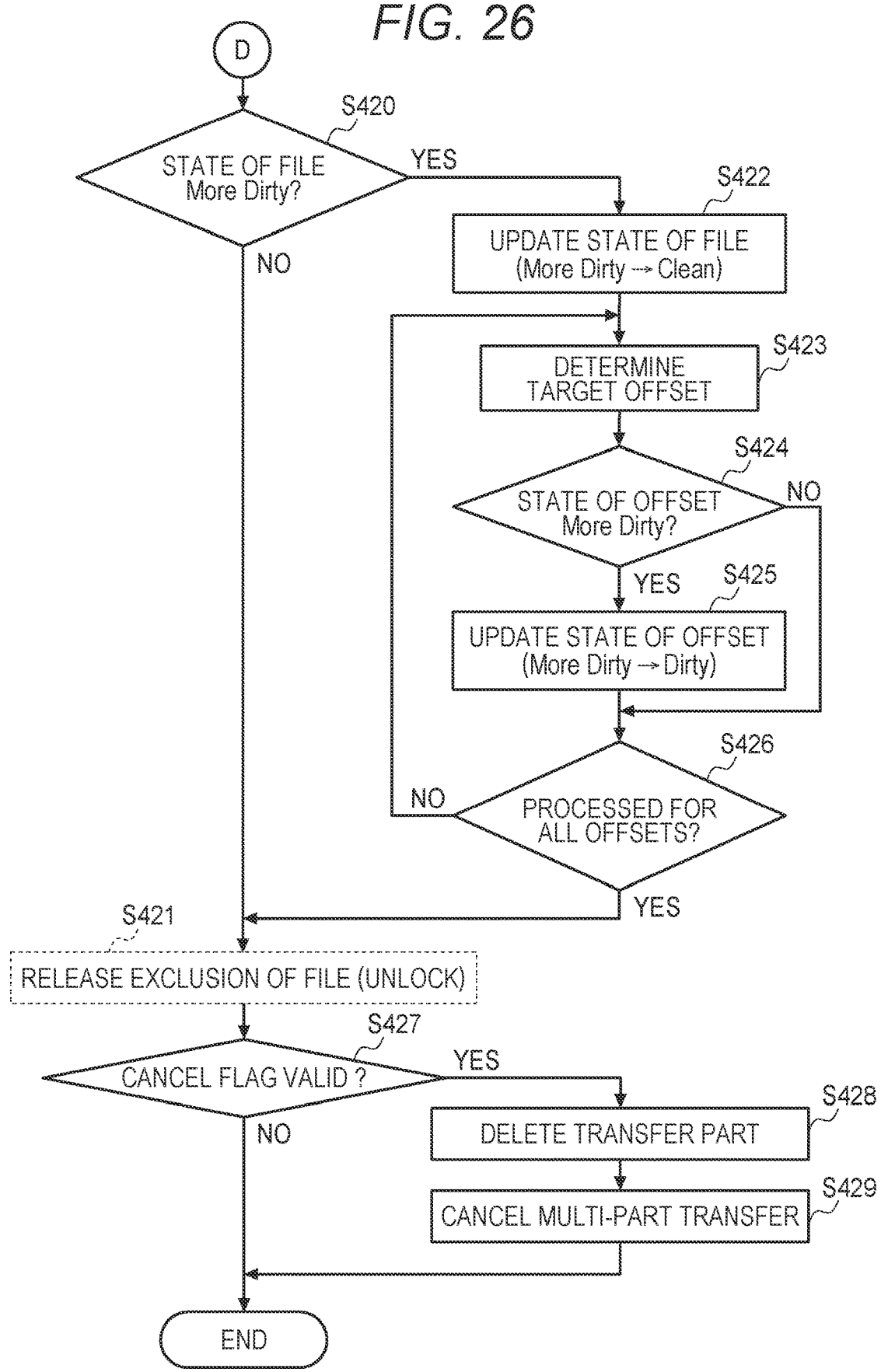
FIG. 26 is a flowchart illustrating post-stage processing illustrated in step S313 in FIG. 17.

FIGS. 24 to 26 are flowcharts illustrating the post-stage processing illustrated in step S313 of FIG. 17. The series of processing continued from FIG. 16 is executed after the target file, which is a file to be processed, is determined in advance as described above.

First, in step S390, the replicator 236 determines whether or not the determination abnormality flag of the target file is valid. The replicator 236 proceeds to step S394 when determining that the determination abnormality flag of the target file is valid, and proceeds to step S391 when determining that the determination abnormality flag of the target file is not valid. In step S391, the replicator 236 determines whether or not the cancel flag of the target file is valid. The replicator 236 proceeds to step S394 when determining that the cancel flag of the target file is valid, and proceeds to step S392 when determining that the cancel flag of the target file is not valid.

In step S392, the replicator 236 acquires the exclusion of the target file, and proceeds to step S400 in FIG. 25 via circled C. In step S394, the replicator 236 acquires the exclusion of the target file, and proceeds to step S420 in FIG. 26 via circled D.

The description will be continued with reference to FIG. 25. In step S400 executed from step S393 via the circled C, the replicator 236 determines whether or not the state flag of the target file is "More Dirty". The replicator 236 proceeds to step S410 when determining that the state flag of the target file is "More Dirty", and proceeds to step S401 when determining that the state flag of the target file is not "More Dirty".

In step S401, the replicator 236 updates the state flag of the target file from "Dirty" to "Clean", and proceeds to step S402. In the subsequent step S402, the replicator 236 determines a target offset which is an offset to be processed. The target offset is an offset in the target file, and any offset that is not selected as the target offset in this step is determined.

In the subsequent step S403, the replicator 236 determines a state flag of the target offset. The replicator 236 proceeds to step S405 when determining that the state flag of the target offset is "Transferred", proceeds to step S404 when determining that the state flag of the target offset is "Copied", and proceeds to step S406 when determining that the state flag of the target offset is "Clean" or "Dirty".

In step S404, the replicator 236 changes the state flag of the target offset from "Transferred" to "Clean" and proceeds to step S406. In step S405, the replicator 236 changes the state flag of the target offset from "Copied" to "Clean" and proceeds to step S406. In step S406, the replicator 236 determines whether or not all offsets of the target file have been processed. The replicator 236 proceeds to step S407 when determining that all the offsets have been processed, and returns to step S402 when determining that there is an unprocessed offset.

In step S410 executed when affirmative determination is made in step S400, the replicator 236 updates the state flag of the target file from "More Dirty" to "Dirty", and proceeds to step S411. In step S411, the replicator 236 determines a target offset which is an offset to be processed. The target offset is an offset in the target file, and any offset that is not selected as the target offset in this step is determined.

In the subsequent step S412, the replicator 236 determines whether or not the state flag of the target offset is "More Dirty". The replicator 236 proceeds to step S413 when determining that the state flag of the target offset is "More Dirty", and proceeds to step S414 when determining that the state flag of the target offset is not "More Dirty".

In step S413, the replicator 236 changes the state flag of the target offset from "More Dirty" to "Dirty" and proceeds to step S414. In step S414, the replicator 236 determines whether or not all the offsets of the target file have been processed. The replicator 236 proceeds to step S407 when determining that all the offsets have been processed, and returns to step S411 when determining that there is an unprocessed offset.

In step S407 executed when an affirmative determination is made in step S406 or when an affirmative determination is made in step S414, the replicator 236 releases the exclusion of the target file and ends the processing illustrated in FIG. 25. Note that the release of the exclusion in step S407 corresponds to the acquisition of the exclusion in step S392 in FIG. 24.

The description will be continued with reference to FIG. 26. In step S420 executed from step S395 via the circled D, the replicator 236 determines whether or not the state flag of the target file is "More Dirty". The replicator 236 proceeds to step S422 when determining that the state flag of the target file is "More Dirty", and proceeds to step S421 when determining that the state flag of the target file is not "More Dirty".

In step S422, the replicator 236 updates the state flag of the target file from "More Dirty" to "Clean", and proceeds to step S423. In step S423, the replicator 236 determines a target offset which is an offset to be processed. The target offset is an offset in the target file, and any offset that is not selected as the target offset in this step is determined.

In the subsequent step S424, the replicator 236 determines whether or not the state flag of the target offset is "More Dirty". The replicator 236 proceeds to step S425 when determining that the state flag of the target offset is "More Dirty", and proceeds to step S426 when determining that the state flag of the target offset is not "More Dirty".

In step S425, the replicator 236 changes the state flag of the target offset from "More Dirty" to "Dirty", and proceeds to step S426. In step S426, the replicator 236 determines whether or not all the offsets of the target file have been processed. The replicator 236 proceeds to step S421 when determining that all the offsets have been processed, and returns to step S423 when determining that there is an unprocessed offset.

In step S421, the replicator 236 releases the exclusion of the target file and proceeds to step S427. Note that the release of the exclusion in step S421 corresponds to the acquisition of the exclusion in step S394 in FIG. 24. In step S427, the replicator 236 determines whether or not the cancel flag of the target file is valid. The replicator 236 proceeds to step S428 when determining that the cancel flag is valid, and ends the processing illustrated in FIG. 26 when determining that the cancel flag is invalid. The replicator 236 deletes the transfer part in step S428, cancels the multi-part transfer in the subsequent step S429, and ends the processing illustrated in FIG. 26.

Figure 27:
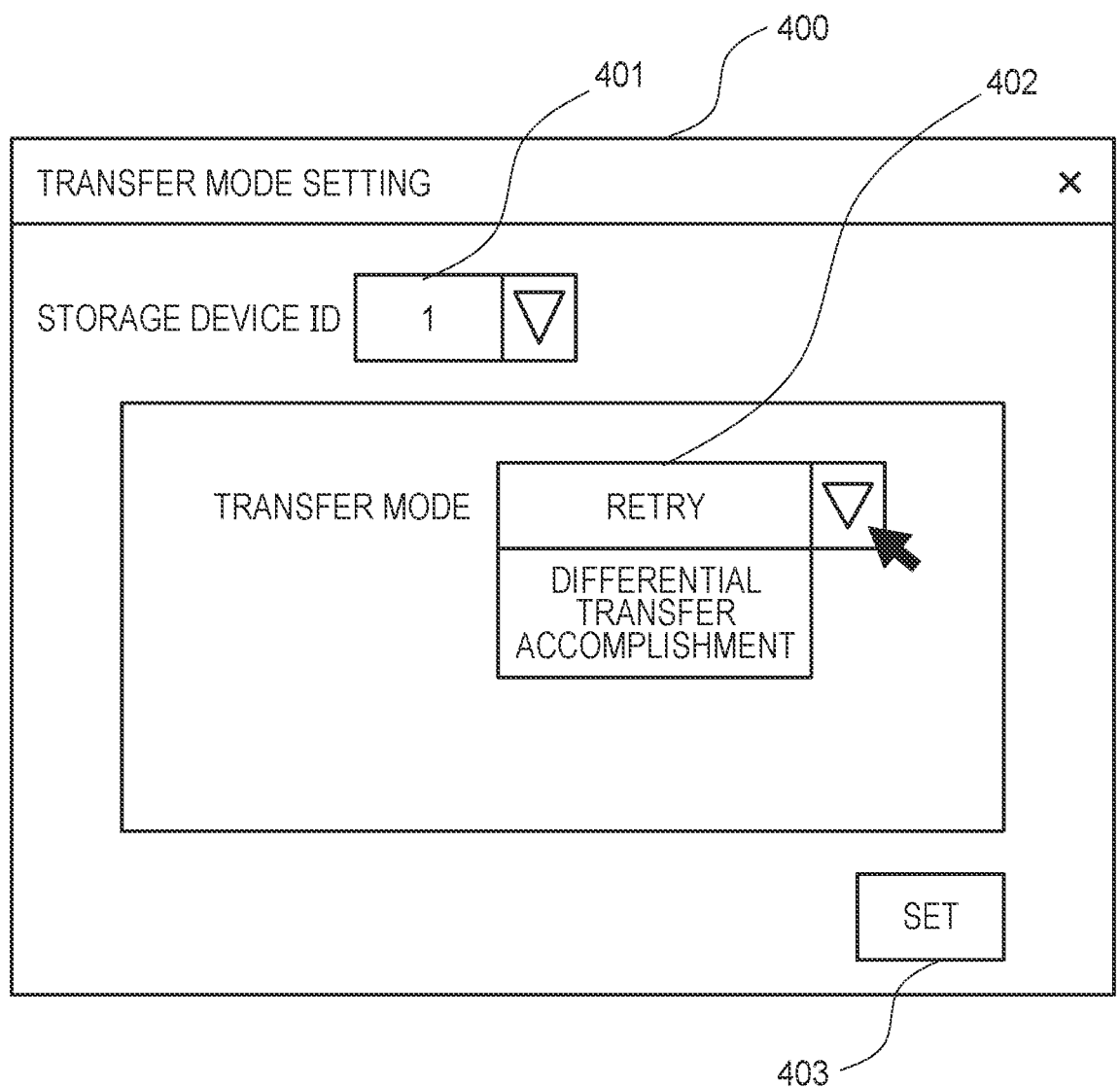
FIG. 27 is a diagram illustrating a user interface for setting a transfer mode.

FIG. 27 is a diagram illustrating a user interface for setting a transfer mode. A transfer mode setting screen 400 includes a device selection field 401 for selecting a target storage device and a mode setting field 402 for setting a transfer mode. In the configuration of the computer 111 illustrated in FIG. 2, there is only one auxiliary storage device 213. However, in a case where a plurality of auxiliary storage devices 213 are provided or in a case where a storage device provided outside the computer 111, for example, a network attached storage (NAS) is available, the device for setting the mode can be changed by operating the device selection field 401.

In the mode setting field 402, any one of three modes available in the MPU, that is, "retry", "differential transfer", and "accomplishment" can be selected. When the user performs selection in the device selection field 401 and the mode setting field 402 and presses a setting button 403 illustrated at the lower right of the transfer mode setting screen 400, the setting is recorded in an area (not illustrated) of the computer 111. Note that the transfer mode does not need to be set in units of storage devices, and may be set in units of the user file 221, for example.

According to the first embodiment described above, the following operational effects can be obtained.

(1) The file transfer system 100 transfers the target file updated in the computer 111 to the object storage 130 for each part obtained by dividing the target file. The file transfer system 100 includes an IO hook program 234 that records the update position of the target file in the computer 111 as the offset flag 225, the processing of S306 of FIG. 16 of the replicator 236 that refers to the offset flag 225 and determines the presence or absence of the update for each part of the target file, and the replicator 236 that transfers the part determined to have update by the replicator 236 to the object storage 130. When re-update in which the target file is updated after the replicator 236 starts transfer of any part included in the target file by the MPU occurs, the replicator 236 transmits a re-update part, which is a part updated by the re-update, to the object storage 130 regardless of whether or not the part has already been transferred. Therefore, the file transfer system 100 can efficiently transfer the target file from the computer 111 to the object storage 130 by detecting the occurrence of the update in the target file without temporarily copying the target file.

(2) The replicator 236 causes the target file to transition to the write inhibit state before referring to the offset flag 225 (S302 in FIG. 16), and causes the target file to transition to the writable state when completing reference of the offset flag (S305 in FIG. 16). Therefore, the time during which writing to the target file cannot be performed can be made to fall within a very short time.

(3) The file transfer system 100 includes a replicator 236 (S308 in FIG. 17, FIG. 19) that causes the object storage 130 to duplicate a part determined to have no update by the replicator 236, by using a target file before update stored in the object storage 130. The object storage 130 integrates the part transferred by the replicator 236 and the part duplicated based on the instruction of the replicator 236 to obtain the updated target file in the second computer (FIG. 12, FIG. 15). Therefore, by using previously transferred data, the data transfer amount and the time required for data transfer can be reduced.

(4) The MPU by the replicator 236 is repeatedly executed at predetermined time intervals. When the transfer mode is "accomplishment" (from S314 to S317 in FIG. 17), the replicator 236 repeats the transmission of the re-update part to the object storage 130 without waiting for a predetermined time interval until the re-update does not occur. Therefore, the transfer can be completed early.

(5) The MPU by the replicator 236 is repeatedly executed at predetermined time intervals. When the transfer mode is "retry" or "differential transfer" (S314 to S315, S316 in FIG. 17), the replicator 236 repeats the transmission of the re-update part to the object storage 130 according to predetermined time intervals until the re-update does not occur. Therefore, the execution time of each MPU that is periodically executed can be shortened.

(6) In a case where the transfer mode is "retry", when the re-update occurs, the replicator 236 further transmits again a part that has not been updated in the re-update and has been previously transmitted (S315 in FIG. 17, FIG. 21). Therefore, the transmitted part can be retransmitted just in case.

(7) In a case where the transfer mode is "differential transfer", when a re-update occurs, the replicator 236 does not transmit again a part that has not been updated in the re-update and has been previously transmitted (S316 in FIG. 17, FIG. 22). Therefore, the processing time can be saved by transmitting only the data required by the re-update again.

(Modification 1)

In FIG. 17, the order of step S310 and step S311 may be switched. That is, whether or not the target file is updated during the MPU and the state flag is changed to "More Dirty" may be determined after the part duplication processing or the part transfer processing is completed for all parts of the target file. In addition, the operation mode of the replicator 236 may be set in advance and does not need to correspond to other transfer modes.

(Modification 2)

In the embodiment described above, the user file 221 transmitted from the computer 111 to the object storage 130 is stored in the computer 111. However, the user file 221 does not need to be stored in the computer 111. For example, the user file 221 may be stored in another device connected to the computer 111 via a network.

In the above-described embodiments and modifications, the configuration of the functional block is merely an example. Some functional configurations illustrated as separate functional blocks may be integrally configured, or a configuration illustrated in one functional block diagram may be divided into two or more functions. In addition, some of the functions of each functional block may be included in another functional block.

In the above-described embodiments and modifications, the program of the computer 111 is stored in the ROM (not illustrated), but the program may be stored in the auxiliary storage device 213. In addition, the computer 111 may include an input/output interface (not illustrated), and a program may be read from another device via the input/output interface and a medium available for the computer 111 when necessary. Here, the medium refers to, for example, a storage medium detachable from the input/output interface, or a communication medium, that is, a wired, wireless, or optical network, or a carrier wave or a digital signal propagating through the network. Some or all of the functions implemented by the program may be implemented by a hardware circuit or an FPGA.

The above-described embodiments and modifications may be combined. Although various embodiments and modifications have been described above, the present invention is not limited to these contents. Other embodiments conceivable within the scope of the technical idea of the present invention are also included in the scope of the present invention.

What is claimed is:

1. A file transfer system, comprising:
a first computer;
a second computer coupled to the first computer,
wherein the first computer is configured to transfer a target file to the second computer, the target file being updated in the first computer and including a plurality of parts obtained by dividing the target file,
wherein the first computer stores a file flag, a part flag for each of the plurality of parts, and an offset flag for one or more offsets of each part, each file flag having a first value or a second value, and each part flag and each offset flag having at least the first value or the second value,
wherein, during the transfer of the plurality of parts to the second computer, the first computer is configured to:
record an update of the target file as an offset of a part among the parts,
set the offset flag of the offset as a second value indicating there has been an update during the transfer of the parts of the target file,
set the file flag of the target file to the second value,
refer to the offset flag and determine a presence or absence of the update for each part of the target file, and
transfer the part determined to have been updated to the second computer,
after the transfer, determine whether the file flag of the target file has the first value or the second value, and upon determining the file flag of the target file has the second value, change the file flag of the target file to the first value,
re-transfer the part having the offset flag of the second value, and
after the re-transfer of the part, determine whether the file flag of the target file has the first value or the second value, and upon determining the file flag of the target file has the first value perform combination determination processing.

2. The file transfer system according to claim 1,
wherein the first computer is configured to: cause the target file to transition to a write inhibit state before referring to the offset flag, and cause the target file to transition to a writable state when completing reference of the offset flag.

3. The file transfer system according to claim 1, wherein the first computer is configured to cause the second computer to duplicate a part determined to have no update by using the target file before update stored in the second computer, and
wherein the second computer is configured to integrate the transferred part and the part duplicated based on an instruction of the first computer to obtain the updated target file in the second computer.

4. The file transfer system according to claim 1,
wherein the first computer is configured to:
determine whether the target file has been updated repeatedly at predetermined time intervals, and
repeat transmission of the updated part to the second computer without waiting for the predetermined time interval.

5. The file transfer system according to claim 1,
wherein the first computer is configured to:
determine whether the target file has been updated repeatedly at predetermined time intervals, and
repeat transmission of the updated part to the second computer according to the predetermined time interval.

6. The file transfer system according to claim 1,
wherein the first computer is configured to, when the target file is updated, transfer a part among the parts of the target file that has not been updated by the update and has been previously transmitted again.

7. The file transfer system according to claim 1,
wherein the first computer is configured to, when the target file is updated, do not transfer a part that has not been updated by the update and has been previously transmitted again.

8. A file transfer method, comprising:
transferring, from a first computer to a second computer, a target file, the target file being updated in the first computer and including a plurality of parts obtained by dividing the target file;
storing, by the first computer, a file flag, a part flag for each of the plurality of parts, and an offset flag for one or more offsets of each part, each file flag having a first value or a second value, and each part flag and each offset flag having at least the first value or the second value;
during the transfer of the plurality of parts to the second computer:
recording an update of the target file as an offset of a part among the parts;
setting the offset flag of the offset as a second value indicating there has been an update during the transfer of the parts of the target file; and
setting the file flag of the target file to the second value;
determining a presence or absence of update for each part in the target file with reference to the offset flag;
transferring the part determined to have been updated to the second computer;
after the transfer, determining whether the file flag of the target file has the first value or the second value, and upon determining the file flag of the target file has the second value, change the file flag of the target file to the first value;
re-transferring the part having the offset flag of the second value; and
after the re-transfer of the part, determining whether the file flag of the target file has the first value or the second value, and upon determining the file flag of the target file has the first value perform combination determination processing.

9. A non-transitory compute readable medium storing a file transfer program executable by a first computer, the file transfer program comprising:
transferring, from a first computer to a second computer, a target file, the target file being updated in the first computer and including a plurality of parts obtained by dividing the target file;
storing, by the first computer, a file flag, a part flag for each of the plurality of parts, and an offset flag for one or more offsets of each part, each file flag having a first value or a second value, and each part flag and each offset flag having at least the first value or the second value;
during the transfer of the plurality of parts to the second computer:

recording an update of the target file as an offset of a part among the parts;

setting the offset flag of the offset as a second value indicating there has been an update during the transfer of the parts of the target file; and setting the file flag of the target file to the second value;

referring to the offset flag and determining a presence or absence of an update for each part of the target file;

transferring the part determined to have been updated to the second computer;

after the transfer, determining whether the file flag of the target file has the first value or the second value, and upon determining the file flag of the target file has the second value, change the file flag of the target file to the first value;

re-transferring the part having the offset flag of the second value; and after the re-transfer of the part, determining whether the file flag of the target file has the first value or the second value, and upon determining the file flag of the target file has the first value perform combination determination processing.

\* \* \* \* \*